United States Patent
Meyer et al.

(10) Patent No.: US 10,650,397 B2
(45) Date of Patent: *May 12, 2020

(54) TRIGGERING AND CONDUCTING AN AUTOMATED SURVEY

(71) Applicant: XPO Last Mile, Inc., Marietta, GA (US)

(72) Inventors: Karl Meyer, Atlanta, GA (US); Jonathan Turner, Marietta, GA (US)

(73) Assignee: XPO Last Mile, Inc., Marietta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/278,507

(22) Filed: Feb. 18, 2019

(65) Prior Publication Data

US 2019/0180299 A1 Jun. 13, 2019

Related U.S. Application Data

(63) Continuation of application No. 14/746,207, filed on Jun. 22, 2015, now Pat. No. 10,262,329, which is a (Continued)

(51) Int. Cl.
*G06Q 30/02* (2012.01)
*G06Q 10/00* (2012.01)
(Continued)

(52) U.S. Cl.
CPC ......... *G06Q 30/0203* (2013.01); *G06Q 10/00* (2013.01); *G06Q 10/0631* (2013.01); *G06Q 10/06311* (2013.01); *G06Q 10/083* (2013.01); *G06Q 10/0833* (2013.01); *G06Q 30/016* (2013.01); *G06Q 30/02* (2013.01); *G06Q 30/0282* (2013.01); *G06Q 10/1095* (2013.01); *G08G 1/123* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | |
|---|---|---|
| 4,937,439 A | 6/1990 | Wanninger et al. |
| 5,309,505 A | 5/1994 | Szlam et al. |

(Continued)

FOREIGN PATENT DOCUMENTS

| | | |
|---|---|---|
| WO | 2002044829 | 6/2002 |
| WO | 2008107880 | 9/2008 |

OTHER PUBLICATIONS

Meyer, Karl; Non-Final Office Action for U.S. Appl. No. 12/722,463, filed Mar. 11, 2010, dated Aug. 16, 2012; 26 pgs.

(Continued)

*Primary Examiner* — Alan S Miller
(74) *Attorney, Agent, or Firm* — Taylor English Duma LLP

(57) ABSTRACT

Systems and methods for initiating and conducting an automated survey are disclosed herein. According to some implementations, a processing device of a computer may receive a notification of an occurrence of a trigger event after the occurrence of the trigger event, initiate an automated survey to be offered to the customer, conduct the automated survey with the customer, and receive survey result information from the customer in response to the automated survey.

20 Claims, 24 Drawing Sheets

Related U.S. Application Data continuation of application No. 12/722,455, filed on Mar. 11, 2010, now abandoned.

(60) Provisional application No. 61/266,599, filed on Dec. 4, 2009.

(51) Int. Cl.

| G06Q 10/06 | (2012.01) |
|---|---|
| G06Q 10/08 | (2012.01) |
| G06Q 30/00 | (2012.01) |
| G06Q 10/10 | (2012.01) |
| G08G 1/123 | (2006.01) |

(56) References Cited

U.S. PATENT DOCUMENTS

| | | |
|---|---|---|
| 5,400,020 A | 3/1995 | Jones et al. |
| 5,414,754 A | 5/1995 | Pugh et al. |
| 5,444,444 A | 8/1995 | Ross |
| 5,517,405 A | 5/1996 | McAndrew et al. |
| 5,623,260 A | 4/1997 | Jones |
| 5,648,770 A | 7/1997 | Ross |
| 5,657,010 A | 8/1997 | Jones |
| 5,668,543 A | 9/1997 | Jones |
| 5,703,935 A | 12/1997 | Raissyan et al. |
| 5,706,441 A | 1/1998 | Lockwood |
| 5,764,923 A | 6/1998 | Tallman et al. |
| 5,838,774 A | 11/1998 | Weisser, Jr. |
| 5,884,032 A | 3/1999 | Bateman et al. |
| 5,893,098 A | 4/1999 | Peters et al. |
| 5,924,073 A | 7/1999 | Tyuluman et al. |
| 5,943,416 A | 8/1999 | Gisby |
| 5,956,693 A | 9/1999 | Geerlings |
| 5,987,377 A | 11/1999 | Westerlage et al. |
| 6,032,177 A | 2/2000 | O'Donnell |
| 6,101,483 A | 8/2000 | Petrovich et al. |
| 6,151,581 A | 11/2000 | Kraftson et al. |
| 6,151,584 A | 11/2000 | Papierniak et al. |
| 6,278,936 B1 | 8/2001 | Jones |
| 6,311,190 B1 | 10/2001 | Bayer et al. |
| 6,313,760 B1 | 11/2001 | Jones |
| 6,317,060 B1 | 11/2001 | Jones |
| 6,363,254 B1 | 3/2002 | Jones et al. |
| 6,363,323 B1 | 3/2002 | Jones |
| 6,370,231 B1 | 4/2002 | Hice |
| 6,380,928 B1 * | 4/2002 | Todd .................... G06Q 30/02 345/169 |
| 6,381,744 B2 | 4/2002 | Nanos et al. |
| 6,411,891 B1 | 6/2002 | Jones |
| 6,415,207 B1 | 7/2002 | Jones |
| 6,477,504 B1 | 11/2002 | Hamlin et al. |
| 6,480,599 B1 | 11/2002 | Ainslie et al. |
| 6,483,433 B2 | 11/2002 | Moskowitz et al. |
| 6,486,801 B1 | 11/2002 | Jones |
| 6,492,912 B1 | 12/2002 | Jones |
| 6,496,775 B2 | 12/2002 | McDonald et al. |
| 6,510,383 B1 | 1/2003 | Jones |
| 6,513,014 B1 | 1/2003 | Walker et al. |
| 6,532,465 B2 | 3/2003 | Hartley et al. |
| 6,539,392 B1 | 3/2003 | Rebane |
| 6,564,207 B1 | 5/2003 | Abdoh |
| 6,574,621 B1 | 6/2003 | Lautzenheiser et al. |
| 6,618,668 B1 | 9/2003 | Laird |
| 6,665,395 B1 | 12/2003 | Busey et al. |
| 6,683,542 B1 | 1/2004 | Jones |
| 6,684,195 B1 | 1/2004 | Deaton et al. |
| 6,700,507 B2 | 3/2004 | Jones |
| 6,714,859 B2 | 3/2004 | Jones |
| 6,741,927 B2 | 5/2004 | Jones |
| 6,748,318 B1 | 6/2004 | Jones |
| 6,748,320 B2 | 6/2004 | Jones |
| 6,763,299 B2 | 7/2004 | Jones |
| 6,763,300 B2 | 7/2004 | Jones |
| 6,804,606 B2 | 10/2004 | Jones |
| 6,807,274 B2 | 10/2004 | Joseph et al. |
| 6,859,722 B2 | 2/2005 | Jones |
| 6,898,435 B2 | 5/2005 | Milman |
| 6,904,359 B2 | 6/2005 | Jones |
| 6,912,521 B2 | 6/2005 | Kraft et al. |
| 6,934,684 B2 | 8/2005 | Alpdemir et al. |
| 6,952,645 B1 | 10/2005 | Jones |
| 6,962,531 B2 | 11/2005 | Pace et al. |
| 6,963,848 B1 * | 11/2005 | Brinkerhoff ....... G06Q 10/0639 705/7.32 |
| 6,970,831 B1 | 11/2005 | Anderson |
| 6,975,998 B1 | 12/2005 | Jones |
| 6,980,131 B1 | 12/2005 | Taylor |
| 6,999,565 B1 | 2/2006 | Delaney et al. |
| 6,999,987 B1 | 2/2006 | Billingsley et al. |
| 7,026,925 B2 | 4/2006 | Roche et al. |
| 7,030,781 B2 | 4/2006 | Jones |
| 7,050,569 B1 | 5/2006 | Weaver et al. |
| 7,089,107 B2 | 8/2006 | Jones |
| 7,133,834 B1 | 11/2006 | Abelow |
| 7,171,372 B2 | 1/2007 | Daniel |
| 7,191,058 B2 | 3/2007 | Laird et al. |
| 7,251,312 B2 | 7/2007 | D'Evelyn et al. |
| 7,346,505 B1 * | 3/2008 | Sherwood ......... H04M 3/53333 379/100.08 |
| 7,353,230 B2 | 4/2008 | Hamilton |
| 7,400,970 B2 | 7/2008 | Jones |
| 7,509,266 B2 | 3/2009 | Rogers et al. |
| 7,526,434 B2 | 4/2009 | Sharp |
| 7,558,380 B2 | 7/2009 | Divenuta et al. |
| 7,584,115 B2 | 9/2009 | Sahagian |
| 7,600,682 B2 | 10/2009 | Bezos et al. |
| 7,606,726 B2 | 10/2009 | Nelson |
| 7,609,832 B2 | 10/2009 | Kreiner et al. |
| 7,613,627 B2 | 11/2009 | Doyle et al. |
| 7,644,057 B2 | 1/2010 | Nelken et al. |
| 7,698,162 B2 | 4/2010 | Vaccarelli |
| 7,761,348 B2 | 7/2010 | Amling et al. |
| 7,856,406 B2 | 12/2010 | Leventhal |
| 7,860,803 B1 | 12/2010 | Chang et al. |
| 7,877,265 B2 | 1/2011 | Pasquale et al. |
| 7,899,700 B2 | 3/2011 | Floyd et al. |
| 7,909,241 B2 | 3/2011 | Stone et al. |
| 8,094,804 B2 | 1/2012 | Flockhart et al. |
| 8,100,322 B1 | 1/2012 | Nachenburg |
| 8,223,953 B2 | 7/2012 | Houmaidi |
| 8,255,248 B1 | 8/2012 | Del Favero et al. |
| 8,290,808 B2 | 10/2012 | Bower, Jr. et al. |
| 8,515,803 B2 | 8/2013 | Meyer |
| 10,262,329 B2 | 4/2019 | Meyer et al. |
| 2001/0037206 A1 | 11/2001 | Falk et al. |
| 2001/0047292 A1 | 11/2001 | Montoya |
| 2002/0002633 A1 | 1/2002 | Colling |
| 2002/0007299 A1 | 1/2002 | Florence |
| 2002/0007303 A1 | 1/2002 | Brookler et al. |
| 2002/0032613 A1 | 3/2002 | Buettgenbach et al. |
| 2002/0035474 A1 | 3/2002 | Alpdemir |
| 2002/0052774 A1 | 5/2002 | Parker et al. |
| 2002/0062251 A1 | 5/2002 | Anandan et al. |
| 2002/0077750 A1 | 6/2002 | McDonald et al. |
| 2002/0103693 A1 | 8/2002 | Bayer |
| 2002/0120491 A1 | 8/2002 | Nelson |
| 2002/0138338 A1 | 9/2002 | Trauth et al. |
| 2002/0173934 A1 | 11/2002 | Potenza |
| 2002/0173990 A1 | 11/2002 | Marasco |
| 2002/0194047 A1 | 12/2002 | Edinger et al. |
| 2003/0018510 A1 | 1/2003 | Sanches |
| 2003/0065522 A1 | 4/2003 | Wepfer et al. |
| 2003/0069797 A1 | 4/2003 | Harrison |
| 2003/0114206 A1 | 6/2003 | Timothy et al. |
| 2003/0135405 A1 | 7/2003 | Townsend et al. |
| 2003/0163380 A1 | 8/2003 | Vaccarelli |
| 2003/0167197 A1 | 9/2003 | Shoemaker et al. |
| 2003/0200135 A1 | 10/2003 | Wright |
| 2003/0220827 A1 | 11/2003 | Murphy |
| 2003/0233190 A1 | 12/2003 | Jones |
| 2004/0006478 A1 | 1/2004 | Alpdemir et al. |
| 2004/0014479 A1 | 1/2004 | Milman |
| 2004/0030604 A1 | 2/2004 | Young |

(56) References Cited

U.S. PATENT DOCUMENTS

| | | |
|---|---|---|
| 2004/0059624 A1 | 3/2004 | Wantulok et al. |
| 2004/0117470 A1 | 6/2004 | Rehm |
| 2004/0128155 A1 | 7/2004 | Vaidyanathan et al. |
| 2004/0128183 A1 | 7/2004 | Challey et al. |
| 2004/0128186 A1 | 7/2004 | Breslin et al. |
| 2004/0149824 A1 | 8/2004 | Miller et al. |
| 2004/0172323 A1 | 9/2004 | Stamm |
| 2004/0181443 A1 | 9/2004 | Horton et al. |
| 2004/0220848 A1 | 11/2004 | Leventhal |
| 2004/0230438 A1 | 11/2004 | Pasquale et al. |
| 2004/0230989 A1 | 11/2004 | Macey et al. |
| 2005/0006470 A1 | 1/2005 | Mrozik et al. |
| 2005/0027666 A1 | 2/2005 | Beck et al. |
| 2005/0100158 A1 | 5/2005 | Kreiner et al. |
| 2005/0111628 A1 | 5/2005 | Beamon |
| 2005/0114167 A1 | 5/2005 | McEvoy |
| 2005/0130110 A1* | 6/2005 | Gosling .............. G09B 7/00 434/322 |
| 2005/0147228 A1 | 7/2005 | Perrella et al. |
| 2005/0159977 A1 | 7/2005 | Green et al. |
| 2005/0171856 A1 | 8/2005 | Takahashi et al. |
| 2005/0182638 A1 | 8/2005 | Odent et al. |
| 2005/0192848 A1 | 9/2005 | Kozminski et al. |
| 2005/0203809 A1 | 9/2005 | Stone et al. |
| 2006/0053058 A1 | 3/2006 | Hotchkiss et al. |
| 2006/0074768 A1 | 4/2006 | Horton |
| 2006/0080145 A1 | 4/2006 | Cook et al. |
| 2006/0111089 A1 | 5/2006 | Winter et al. |
| 2006/0111955 A1 | 5/2006 | Winter et al. |
| 2006/0258347 A1* | 11/2006 | Chitrapu ............. H04L 69/329 455/423 |
| 2006/0259347 A1 | 11/2006 | Ohashi |
| 2006/0262922 A1 | 11/2006 | Margulies |
| 2007/0005536 A1 | 1/2007 | Caswell et al. |
| 2007/0043811 A1 | 2/2007 | Kim et al. |
| 2007/0071184 A1 | 3/2007 | Clift et al. |
| 2007/0083472 A1 | 4/2007 | Israel |
| 2007/0141976 A1 | 6/2007 | Shimakawa et al. |
| 2007/0168241 A1 | 7/2007 | Robbins |
| 2007/0179805 A1 | 8/2007 | Gilbert et al. |
| 2007/0198325 A1 | 8/2007 | Lyerly et al. |
| 2007/0226047 A1 | 9/2007 | Ward |
| 2007/0233549 A1 | 10/2007 | Watson et al. |
| 2007/0255491 A1 | 11/2007 | Geelen et al. |
| 2007/0279222 A1 | 12/2007 | Carrigan |
| 2007/0282661 A1 | 12/2007 | Franco |
| 2007/0285227 A1 | 12/2007 | Timothy et al. |
| 2008/0021762 A1 | 1/2008 | Coon et al. |
| 2008/0040129 A1 | 2/2008 | Cauwels et al. |
| 2008/0040189 A1 | 2/2008 | Tong et al. |
| 2008/0052346 A1 | 2/2008 | Bassat et al. |
| 2008/0077468 A1 | 3/2008 | Raskin |
| 2008/0082257 A1 | 4/2008 | Lee |
| 2008/0147427 A1 | 6/2008 | Terui |
| 2008/0298350 A1 | 12/2008 | Croak et al. |
| 2009/0005038 A1 | 1/2009 | Yasrebi et al. |
| 2009/0012828 A1 | 1/2009 | Brower et al. |
| 2009/0030811 A1 | 1/2009 | Gilberto et al. |
| 2009/0089135 A1 | 4/2009 | Minert et al. |
| 2009/0104925 A1 | 4/2009 | Aula |
| 2009/0125425 A1 | 5/2009 | Kloostra et al. |
| 2009/0150206 A1 | 6/2009 | Sikes |
| 2009/0157449 A1 | 6/2009 | Itani et al. |
| 2009/0187460 A1 | 7/2009 | Pavagadhi et al. |
| 2009/0204472 A1 | 8/2009 | Einhorn |
| 2009/0220056 A1 | 9/2009 | Simpson et al. |
| 2009/0276279 A1 | 11/2009 | Quesnel et al. |
| 2009/0281929 A1 | 11/2009 | Boitet et al. |
| 2009/0306967 A1 | 12/2009 | Nicolov |
| 2010/0030615 A1 | 2/2010 | Doyle et al. |
| 2010/0080365 A1* | 4/2010 | Seetharaman ...... H04M 1/7255 379/88.22 |
| 2010/0262463 A1* | 10/2010 | Tryfon ............ G06Q 30/0203 705/7.32 |
| 2011/0082721 A1 | 4/2011 | Arni et al. |
| 2011/0093393 A1 | 4/2011 | Chang et al. |
| 2011/0137696 A1 | 6/2011 | Meyer |
| 2011/0137698 A1 | 6/2011 | Meyer |
| 2011/0137709 A1 | 6/2011 | Meyer |
| 2011/0137808 A1 | 6/2011 | Meyer |
| 2011/0173088 A1 | 7/2011 | Stone et al. |
| 2012/0016719 A1 | 1/2012 | Meyer |
| 2012/0016720 A1 | 1/2012 | Meyer |
| 2012/0022905 A1 | 1/2012 | Meyer et al. |
| 2012/0059681 A1 | 3/2012 | Meyer et al. |
| 2014/0046729 A1 | 2/2014 | Meyer |
| 2014/0229238 A1 | 8/2014 | Meyer |
| 2015/0287063 A1 | 10/2015 | Meyer |
| 2019/0236623 A1 | 8/2019 | Meyer et al. |
| 2019/0236624 A1 | 8/2019 | Meyer et al. |

OTHER PUBLICATIONS

Meyer, Karl; Final Office Action for U.S. Appl. No. 12/722,463, filed Mar. 11, 2010, dated Jun. 12, 2012, 26 pgs.

Meyer, Karl; First Action Interview Office Action Summary for U.S. Appl. No. 12/722,463, filed Mar. 11, 2010, dated Mar. 20, 2012; 20 pgs.

Meyer, Karl; First Action Interview Pilot Program Pre-Interview Communication for U.S. Appl. No. 12/722,463, filed Mar. 11, 2010, dated Feb. 1, 2012; 13 pgs.

Meyer, Karl; First Action Interview Pilot Program-Pre-Interview Communication, having U.S. Appl. No. 12/722,474, filed Mar. 11, 2010; dated Jan. 25, 2012; 14 pgs.

Meyer, Karl; Non-Final Office Action for U.S. Appl. No. 13/245,858, filed Sep. 26, 2011, dated Oct. 24, 2013, 47 pgs.

Meyer, Karl; Applicant Initiated Interview Summary for U.S. Appl. No. 13/245,858, filed Sep. 26, 2011; dated Dec. 18, 2012; 3 pgs.

Meyer, Karl; Final Office Action for U.S. Appl. No. 13/245,858, filed Sep. 26, 2011, dated Sep. 13, 2012; 39 pgs.

Meyer, Karl; Applicant Initiated Interview Summary for U.S. Appl. No. 13/245,858, filed Sep. 26, 2011; dated May 31, 2012; 3 pgs.

Meyer, Karl; Non-Final Office Action for U.S. Appl. No. 13/245,858, filed Sep. 26, 2011, dated Feb. 29, 2012; 31 pgs.

Meyer, Karl; first Action Interview Office Action Summary for U.S. Appl. No. 12/722,474, filed Mar. 11, 2010, dated Mar. 2, 2012, 12 pgs.

Meyer, Karl; First Action Interview Pilot Program-Pre-Interview Communication, having U.S. Appl. No. 12/722,455, filed Mar. 11, 2010; dated Dec. 14, 2011; 13 pgs.

Meyer, Karl; Non-Final Office Action for U.S. Appl. No. 13/245,859, filed Sep. 26, 2011, dated Jun. 25, 2013; 40 pgs.

Meyer, Karl; Applicant Initiated Interview Summary for U.S. Appl. No. 12/245,859, filed Sep. 26, 2011, dated Dec. 19, 2012; 3 pgs.

Meyer, Karl; Advisory Action for U.S. Appl. No. 13/245,859, filed Sep. 26, 2011; dated Aug. 21, 2012; 3 pgs.

Meyer, Karl; Final Office Action for U.S. Appl. No. 13/245,859, filed Sep. 26, 2011, dated May 8, 2012, 30 pgs.

Meyer, Karl; Applicant Initiated Interview Summary for U.S. Appl. No. 13/245,859, filed Sep. 26, 2011, dated Dec. 21, 2011; 3 pgs.

Meyer, Karl, Non-Final Office Action for U.S. Appl. No. 13/245,859; filed Sep. 26, 2011; dated Nov. 28, 2011; 17 pages.

Meyer, Karl; Canadian Office Action for U.S Patent Application No. 2,696,345, filed Mar. 11, 2010, dated Jul. 16, 2015, 5 pgs.

Meyer, Karl; Canadian Office Action for U.S Patent Application No. 2,696,345, filed Mar. 11, 2010, dated Jul. 28, 2014, 6 pgs.

Meyer, Karl; Canadian Office Action for U.S Patent Application No. 2,696,345, filed Mar. 11, 2010, dated Aug. 7, 2013, 13 pgs.

Meyer, Karl; Final Office Action for U.S. Appl. No. 12/722,474, filed Mar. 11, 2011, dated May 8, 2012, 16 pgs.

Meyer, Karl; Advisory Action for U.S. Appl. No. 12/722,474, filed Mar. 11, 2010; dated Aug. 21, 2012; 3 pgs.

Meyer, Karl; Non-Final Office Action for U.S. Appl. No. 12/722,474, filed Mar. 11, 2010, dated Nov. 20, 2012; 15 pgs.

Meyer, Karl; Applicant Initiated Interview Summary for U.S. Appl. No. 12/722,474, filed Mar. 11, 2010, dated Dec. 18, 2012; 3 pgs.

Meyer, Karl; Final Office Action for U.S. Appl. No. 12/722,474, filed Mar. 11, 2010, dated Jun. 26, 2013; 37 pgs.

(56) References Cited

OTHER PUBLICATIONS

Meyer, Karl; Applicant Initiated Interview Summary and First action Interview—Office Action for U.S. Appl. No. 12/722,455, filed Mar. 11, 2010; dated Jan. 17, 2013; 5 pgs.
Meyer, Karl; Applicant Initiated Interview Summary for U.S. Appl. No. 12/722,455, filed Mar. 11, 2010, dated Mar. 10, 2014, 3 pgs.
Meyer, Karl; Applicant Initiated Interview Summary for U.S. Appl. No. 12/722,455, filed Mar. 11, 2010; dated May 30, 2012; 3 pgs.
Meyer, Karl; Final Office Action for U.S. Appl. No. 12/722,455, filed Mar. 11, 2010, dated Mar. 25, 2015, 31 pgs.
Meyer, Karl; Non-Final Office Action for U.S. Appl. No. 12/722,455, filed Mar. 11, 2010, dated Jan. 7, 2014, 23 pgs.
Meyer, Karl; Non-Final Office Action for U.S. Appl. No. 12/722,455, filed Mar. 11, 2010, dated Sep. 16, 2014, 35 pgs.
Meyer, Karl; Notice of Allowance for U.S. Appl. No. 12/722,455, dated Jul. 30, 2013, 92 pgs.
Meyer, Karl; Final Office Action for U.S. Appl. No. 12/722,463, filed Mar. 11, 2010, dated Apr. 23, 2013, 35 pgs.
Meyer, Karl, Issue Notification for U.S. Appl. No. 13/245,854, filed Sep. 26, 2011; dated Jul. 31, 2013, 1 pg.
Meyer, Karl, Non-Final Office Action for U.S. Appl. No. 13/245,854, filed Sep. 26, 2011; dated Nov. 10, 2011; 17 pgs.
Meyer, Karl; Applicant Initiated Interview Summary for U.S. Appl. No. 12/722,463, filed Mar. 11, 2010, dated Jul. 18, 2012; 3 pgs.
Meyer, Karl; Applicant Initiated Interview Summary for U.S. Appl. No. 13/245,854, filed Sep. 26, 2011, dated Dec. 1, 2011, 3 pgs.
Meyer, Karl; Applicant Initiated Interview Summary for U.S. Appl. No. 13/245,854, filed Sep. 26, 2011, dated Dec. 11, 2012, 3 pgs.
Meyer, Karl; Applicant Initiated Interview Summary for U.S. Appl. No. 13/245,854, filed Sep. 26, 2011, dated Jun. 5, 2012, 3 pgs.
Meyer, Karl; Applicant-Initiated Interview Summary for U.S. Appl. No. 13/245,854, filed Sep. 26, 2011, dated May 21, 2013, 3 pgs.
Meyer, Karl; Final Office Action for U.S. Appl. No. 13/245,854, filed Sep. 26, 2011, dated Oct. 4, 2012; 41 pgs.
Meyer, Karl; Non-Final Office Action for U.S. Appl. No. 13/245,854, filed Sep. 26, 2011, dated Apr. 11, 2013, 40 pgs.
Meyer, Karl; Non-Final Office Action for U.S. Appl. No. 13/245,854, filed Sep. 26, 2011, dated May 1, 2012, 35 pgs.
Meyer, Karl; Notice of Allowability for U.S. Appl. No. 13/245,854, filed Sep. 26, 2011, dated Jul. 19, 2013, 5 pgs.
Meyer, Karl; Notice of Allowance for U.S. Appl. No. 13/245,854, filed Sep. 26, 2011, dated Jun. 26, 2013; 25 pgs.
Meyer, Karl; Patent Board Decision—Examiner Affirmed for U.S. Appl. No. 14/057,396, filed Oct. 18, 2013, dated Feb. 14, 2019, 39 pgs.
Meyer, Karl; Application Initiated Interview Summary for U.S. Appl. No. 14/057,396, filed Oct. 18, 2013, dated Feb. 20, 2014, 3 pgs.
Meyer, Karl; Examiner's Answer to Appeal for U.S. Appl. No. 14/057,396, filed Oct. 18, 2013, dated Jan. 17, 2017, 23 pgs.
Meyer, Karl; Examiner's Answer to Reply Brief for U.S. Appl. No. 14/057,396, filed Oct. 18, 2013, dated Mar. 23, 2017, 7 pgs.
Meyer, Karl; Final Office Action for U.S. Appl. No. 14/057,396, filed Oct. 18, 2013, dated Jun. 18, 2014, 31 pgs.
Meyer, Karl; Final Office Action for U.S. Appl. No. 14/057,396, filed Oct. 18, 2013, dated Apr. 11, 2016, 44 pgs.
Meyer, Karl; Non-Final Office Action for U.S. Appl. No. 14/057,396, filed Oct. 18, 2013, dated Dec. 31, 2013; 60 pgs.
Meyer, Karl; Non-Final Office Action for U.S. Appl. No. 14/057,396, filed Oct. 18, 2013, dated Sep. 22, 2015, 56 pgs.

Meyer, Karl; Applicant Initiated Interview Summary for U.S. Appl. No. 12/722,463, filed Mar. 11, 2010, dated Mar. 20, 2012; 3 pgs.
Meyer, Karl; Advisory Action for U.S. Appl. No. 14/255,626, filed Apr. 17, 2014, dated Jan. 23, 2015, 3 pgs.
Meyer, Karl; Examiner's Answer to Appeal Brief for U.S. Appl. No. 14/255,626, filed Apr. 17, 2014, mailed Sep. 11, 2017, 18 pgs.
Meyer, Karl; Final Office Action for U.S. Appl. No. 14/255,626, filed Apr. 17, 2014, dated Apr. 14, 2016, 26 pgs.
Meyer, Karl; Final Office Action for U.S. Appl. No. 14/255,626, filed Apr. 17, 2014, dated Nov. 21, 2014, 35 pgs.
Meyer, Karl; Non-Final Office Action for U.S. Appl. No. 14/255,626, filed Apr. 17, 2014, dated May 29, 2014, 63 pgs.
Meyer, Karl; Non-Final Office Action for U.S. Appl. No. 14/255,626, filed Apr. 17, 2014, dated Feb. 3, 2017, 19 pgs.
Meyer, Karl; Non-Final Office Action for U.S. Appl. No. 14/255,626, filed Apr. 17, 2014, dated Oct. 20, 2015, 41 pgs.
Meyer, Karl; Patent Board Decision—Examiner Affirmed for U.S. Appl. No. 14/255,626, filed Apr. 17, 2014, dated Feb. 14, 2019, 14 pgs.
Meyer, Karl; Applicant Initiated Interview Summary for U.S. Appl. No. 12/722,463, filed Mar. 11, 2010, dated Dec. 19, 2012; 3 pgs.
Meyer, Karl; Final Office Action for U.S. Appl. No. 14/746,207, filed Jun. 22, 2015, dated Nov. 16, 2017, 23 pgs.
Meyer, Karl; Issue Notification for U.S. Appl. No. 14/746,207, filed Jun. 22, 2015, dated Mar. 27, 2019, 1 pg.
Meyer, Karl; Non-Final Office Action for U.S. Appl. No. 14/746,207, filed Jun. 22, 2015, dated Jun. 19, 2017, 70 pgs.
Meyer, Karl; Non-Final Office Action for U.S. Appl. No. 14/746,207, filed Jun. 22, 2015, dated Jul. 30, 2018, 24 pgs.
Meyer, Karl; Notice of Allowance for U.S. Appl. No. 14/746,207, filed Jun. 22, 2015, dated Jan. 22, 2019, 8 pgs.
Reh, F. John ""Customer Satisfaction Survey"" © 2005 (http://management.about.com/od/competitiveinfo/a/CustomerSatSu rv.htm, as retrieved from https://web.archive.org/web/20051101062408/http://management.about.com/od/competitiveinfo/a/CustomerSatSurv.htm), 2 pgs.
Proquest, LLC: Vocal Laboratories (as disclosed by combined webpages: The ACCE Best of Show Awards 2006, The Editors. Call Center Magazine 19.11 (Nov. 2006): 34-38, and http://www.vocalabs.com/surveys-and-analytics-express-feedback-real-time-customer-experience-measurement, May 11, 2009) 11 pgs.
"About.com Indianapolis article (""Angie's List is a Rising Star Among Indianapolis Businesses"" (http://web.archive.org/web/20091026215709/ http://indianapolis.about.com/od/upandcomingbusinesses/a/ Ang ieslist. htm)", accessed on Nov. 8, 2013, 3 pgs.
Web pages from www.syntellect.com/pages/products/management_eng.aspx.com and Internet Archive (web.archive.org) showing availability of some information in 2009; 1 page.
Web pages from www.cleardestination.com and Internet Archive (web.archive.org) showing availability of some information in 2008; 26 pages.
Article entitled: "Direct Opinions—Pure Information Performance", located at <http://web.archive.org/web/20070209224447/http://www.directopinions.com/>, accessed on Apr. 6, 2013, 3 pgs.
Meyer, Karl; Notice of Allowance for U.S. Appl. No. 16/382,264, filed Apr. 12, 2019, dated Feb. 14, 2020, 11 pgs.
Meyer, Karl; Non-Final Office Action for U.S. Appl. No. 16/382,257, filed Apr. 12, 2019, dated Nov. 13, 2019, 16 pgs.
Meyer, Karl; Notice of Allowance for U.S. Appl. No. 16/382,257, filed Apr. 12, 2019, dated Jan. 27, 2020, 8 pgs.
Meyer, Karl; Non-Final Office Action for U.S. Appl. No. 16/382,264, filed Apr. 12, 2019, dated Nov. 12, 2019, 16 pgs.

\* cited by examiner

561 - Survey Questions

| Seq | Question ID | Question Description | Answer Options | Show On Web? |
|---|---|---|---|---|
| 1 | AC LANG | "ACME" LANG | 1,2 | ☐ |
| 2 | AC CB4 | "ACME" CB4 | 1,2,3,4,5;* | ☑ |
| 3 | ONTIME | On Time | 1,2,3,4,5;* | ☑ |
| 4 | CAREPP | Care personal prop | 1,2,3,4,5;* | ☑ |
| 5 | IS2 | Assem install w/Scale ▼ | 1,2,3,4,5;* | ☑ |
| 6 | TEAMBK | Assem install w/Scale / ProfCourt / Team Back 2 / Thanks 2 / Voice Mail / Intro-3PD / Intro-Thank You | 1,2,3,4,5;* | ☑ |
| 7 | APPEAR | | | ☐ |
| 8 | RS | | RS | ☑ |
| 9 | VM | | VM | |

[Add] [Delete] [Save] [Exit]

FIG. 11

Acme Survey Questions

Thank you for recent Purchase from Acme To continue in English press 1.
Para continuar en espanol, presione el numero 2

This is 3pd -- an Acme authorized delivery provider. We know your time is valuable but would appreciate you taking 2 minutes to rate our service. Your opinion of our performance is how we measure success!

Please rate the following questions on a scale of 1 through 5, with the number 5 being "Completely Satisfied" and the number 1 being "Not satisfied at all". If the question does not apply to your delivery please press the star key.
That scale again-- 5 is completely satisfied and 1 is completely dissatisfied. Here we go!

- How satisfied were you with the call received from the delivery team to tell you they were on their way?
- 
- How satisfied were you that the delivery team met the time window provided?

- How satisfied were you with the care the delivery team took in protecting your property?

- If your product required installation, how satisfied are you with the delivery team's ability to demonstrate the product?

- How satisfied were you with the delivery Team and would you want the same team back in your home?

- How satisfied were you with the appearance of the delivery team?

Before we say goodbye a few things. Someone from Acme may be contacting you again in the future to obtain additional information on your experience with Acme overall;
Remember that rating us a "5" means you were completely satisfied and anything less that a "5" means you were not completely satisfied. If you feel like you made a mistake on the survey and would like to take it over please press "1" now, If for any reason you could not rate us a 5 please leave us up to a 60 second VM letting us know how we can improve our service. If you have an issue that needs immediate attention please leave us the details and we will be back in touch within an hour. Please press "2" now to leave up to a 60 second message. We value your opinion, so please let us know how we're doing.

*FIG. 12*

Survey Details

Search Response System    Verify Voicemails

| Job Number | 12841 | | Ship To | Jones, Frank |
|---|---|---|---|---|
| Submitted At | 2/17/2010 11:30:00 AM | | Address 1 | 10 Main St. |
| Low Score? | ☐ | | Address 2 | |
| Voicemail | Listen | | City and State | Hometown, NY 12345 |
| Bill To | 18 | -Chicago | Phone | 8853208 |
| Profit Center | 80 | -CHICAGO | Customer PO | 027066 |
| Service | Regular Delivery | | Delivered At | 2/17/2010 10:15:00 AM |
| Driver | Smith, Ralph | | Service Window | 08:00a-12:00p |
| Contract Carrier | Smith Carrier | | Delivery Comments | REMOD/ADDRESSOK/HOME OR GARAGE DEL |

— 240
— 241

| Survey Question | Options | Answer |
|---|---|---|
| CALL BEFORE KRAFTMAID | 1,2,3,4,5 * | 5.00 |
| On Time | 1,2,3,4,5 * | 5.00 |
| Care of Personal Property | 1,2,3,4,5 * | 5.00 |
| Team Back | 1,2,3,4,5 * | 5.00 |
| Appearance | 1,2,3,4,5 * | 5.00 |
| SURVEY AVERAGE | | |

— 242

☐ Resend Email

Email will be sent to contact@3pd.com

☐ Bad Phone Number
☐ Consumer Question
☑ Contact Carrier Issue
☐ Issue With Consumer Home or Delivery Site
☐ Other -- See Documentation In Notes
☐ Scheduling Issue
☐ Store/Client – Poor Service
☐ Unknown -- Customer Didn't Call Back

Enter Your Response Below

| User ID: | jbrown |
|---|---|
| Timestamp: | 2/19/2010 12:06:13 PM |

Actions
- ☐ Addressed Issue with Delivery Team
- ☐ Failed to Contact Consumer
- ☑ Issue Gift Card -- Chargeback Carrier      Value: [25.00]
- ☑ Issue Gift Card -- Do Not Chargeback Carrier    Value: [25.00]
- ☐ Left VM for Consumer
- ☐ Other
- ☑ Passed to Store/Client      Passed To [    ]
- ☐ Spoke With Consumer
- ☐ Voicemail Summary

246

Response: [◀  248  ▶]

250

Closed? ☐ Please select at least one issue category before closing.

252

Insert Cancel

| User ID | Response Time | Actions | Response Text | Gift Card | Closed? |
|---|---|---|---|---|---|
| bsmith | 1/17/2010 11:37:43 AM | Voicemail Summary | The consumer says he had to use his truck and trailer in order to complete the delivery because of the snow and ice. He says he understands, but he would like some sort of reimbursement of the delivery fee because of this. | | ☐ |
| mross | 2/17/2010 12:19:26 PM | Spoke With Consumer, Addressed Issue | I called the CC and asked how the delivery was made and he said that this deliver should have been made with a straight truck but there were no special delivery comments stating this so the CC was unaware until he arrived at the consumer's home. CC said the customer offered his truck and trailer | 50.00 | ☐ |

SURVEY RESPONSE REQUIRED

A consumer survey has been completed that requires a response. 3PD's quality policy requires that all consumer complaints are addressed within 2 hours of the survey.

Click here to respond —257    258

| Ship From ID | 632 | 3PD Job# | 11933403 |
|---|---|---|---|
| Store Desc | ACME #2632 MAPLE | Deliver To | JOSHUA SMITH |
| Service Type | APPLIANCE | Address 1 | 41 MAIN ST |
| Reference | 707 | Address 2 | |
| Order Date | 11/20/2009 6:41:01 PM | City, State and Zip | MAPLE ON L6A |
| Last Update | 11/21/2009 6:31:21 AM | Phone | 905-555-1212 |
| Updated By | Touch Tone | Delivery Date | 11/21/2009 |
| Driver | CC0006: JONES, FRANK | Promised Window | 8A - 12P |
| Carrier Name | G DELIVERY | Arrival Time* | 10:37 AM |
| Order Exceptions | | | |
| Delivery Notes | | | |

260    * Accuracy depends on whether VRU or handhelds are in use.

Auto Survey Results

| Question | Options | Answer |
|---|---|---|
| ACME CALL BEFORE | 1,2,3,4,5,* | 5 |
| On Time | 1,2,3,4,5,* | 5 |
| Care personal prop | 1,2,3,4,5,* | 3 |
| Team Back | 1,2,3,4,5,* | 4 |
| Appearance | 1,2,3,4,5,* | 4 |
| Average | | 4.20 |
| Voicemail Link | 403 VM.wav | |

Auto Survey Responses    264

| UserID | Date/Time | Response Text | Closed? |
|---|---|---|---|
| BBROWN | 11/21/2009 11:51 AM | The customer is dissatisfied because she wanted the items delivered into their garage and the delivery team left the items in their driveway which was very inconvenient for them. | No |

256    *FIG. 19*    262

SURVEY RESPONSE REQUIRED

A consumer survey has been completed that requires a response. 3PD's quality policy requires that all consumer complaints are addressed within 2 hours of the survey.

Click here to respond

| Ship From ID | ACM 46 | 3PD Job# | 119316 |
|---|---|---|---|
| Store Desc | ACME SEATTLE | Deliver To | JULIA SMITH |
| Service Type | REGULAR DELIVERY | Address 1 | 111 MAIN ST |
| Reference | 3117 | Address 2 | |
| Order Date | 11/20/2009 5:45:30 PM | City, State and Zip | BURLINGTON WA 98222 |
| Last Update | 11/20/2009 5:48:30 PM | Phone | 5095551212 |
| Updated By | TouchTone | Delivery Date | 11/21/2009 |
| Driver | CE11726 JONES, FRANK | Promised Window | |
| Carrier Name | G DELIVERY | Arrival Time* | 1:07 PM |
| Order Exceptions | | | |
| Delivery Notes | CUSTOMER WANTS DELIVERY ASAP. COST PIF W VISA VERIFIED INTO AND DEL DATE 11/8 AP ***CCI TO RQST 15 MIN C/A SO SHE OR SOMEONE CAN LET YOU IN GATE. IF NO ANSWER GO TO STORAGE OFFICE. | | |

*268*

*Accuracy depends on whether VRU or handhelds are in use.

Auto Survey Results

| Question | Options | Answer |
|---|---|---|
| Call before | 1,2,3,4,5,* | 1 |
| On Time | 1,2,3,4,5,* | 1 |
| Care personal prop | 1,2,3,4,5,* | 1 |
| Team Back | 1,2,3,4,5,* | 1 |
| Appearance | 1,2,3,4,5,* | 1 |
| Average | | 1.00 |

*—267*

Auto Survey Responses

| UserID | Date/Time | Response Text | Closed? |
|---|---|---|---|

Order Details

| SKU | Bar Code ID | Description | Exception(s) |
|---|---|---|---|
| | | | |
| | | | |

0 UNITS

*269*

Order History

| Date | Log Type | Entered by | Log Text |
|---|---|---|---|
| 11/21/2009 4:13:45 PM | AUTOLOG | Survey | Automated Survey Attempt to 5099937320: Success |
| 11/21/2009 9:01:08 AM | AUTOLOG | BBROWN | ON-BOARDING through Change Job Status Screen (Not just CLONED jobs,ANY Priority, ANY Sched Route Driver, Customer:4   Status:3) |
| 11/20/2009 5:48:30 PM | AUTOLOG | INET | PR_BOOKJOB |

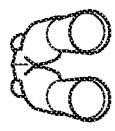

Survey Response Search

☐ Verify Voicemails

Show Open Cases Only
Profit Center  -- All Profit Centers --  ▼  — 272
Begin Survey Date  10/15/2009  — 274
End Survey Date  10/22/2009  — 276
Search — 280                         — 278

| Profit Center | Ship To | Job # | Reported At | Deadline | Age (h) | Low Score? | Voicemail Link | # Responses | Closed | Details |
|---|---|---|---|---|---|---|---|---|---|---|
| 0170 SMITHS SUNRISE | HARRISON, W | 113769 | 10/15/2009 11:50:01 AM | 10/15/2009 1:50:01 PM | 173.400000 | ☑ | | 0 | ☐ | Details |
| 0230 JONES ENGLAND | JEFFERSON, T | 114527 | 10/20/2009 9:50:01 AM | 10/20/2009 11:50:01 AM | 55.400000 | ☐ | Listen | 1 | ☐ | Details |
| 0230 MOUNTAIN | JACKSON, A | 113943 | 10/20/2009 1:23:00 PM | 10/20/2009 3:23:00 PM | 51.900000 | ☑ | Listen | 1 | ☐ | Details |
| 0060 ACME CHICAGO - 00 | LINCOLN, A | 114838 | 10/22/2009 1:30:00 PM | 10/22/2009 3:30:00 PM | 3.800000 | ☐ | Listen | 2 | ☐ | Details |
| 006C ACME CHICAGO - 00 | ADAMS, J | 114839 | 10/22/2009 2:20:01 PM | 10/22/2009 4:20:01 PM | 2.900000 | ☑ | Listen | 2 | ☐ | Details |
| 0060 ACME CHICAGO - 00 | FRANKLIN, B | 114836 | 10/22/2009 2:30:00 PM | 10/22/2009 4:30:00 PM | 2.800000 | ☐ | | 1 | ☐ | Details |
| 0060 ACME NEW YORK - 00 | POLK, J | 114836 | 10/22/2009 4:20:00 PM | 10/22/2009 6:20:00 PM | 0.900000 | ☑ | Listen | 1 | ☐ | Details |
| 0090 VALLEY ATLANTA | MADISON, J | 114920 | 10/22/2009 4:20:00 PM | 10/22/2009 6:20:00 PM | 0.900000 | ☑ | Listen | 1 | ☐ | Details |
| 0380 MOUNTAIN CHICAGO | MONROE, J | 113263 | 10/22/2009 4:30:00 PM | 10/22/2009 6:30:00 PM | 0.800000 | ☑ | | 1 | ☐ | Details |
| 0060 1ACME LOS ANGELES - 00 | WASHINGTON, G | 14957 | 10/22/2009 5:10:00 PM | 10/22/2009 7:10:00 PM | 0.100000 | ☐ | Listen | 1 | ☐ | Details |

3PD: STORE OR PRODUCT CONSUMER ISSUE REPORTED

A consumer issue with either the experience or the product has been reported through 3PD, a home delivery provider contracted by your company. 3PD has reported the issue to the local store as documented in the notes below. The issue is closed in the 3PD issue tracking system and has been passed to the local store for resolution with the consumer.

☑ CONTRACT CARRIER ISSUE
☑ DELIVERY FEE

ISSUE PASSED TO: ANN — 288

| Region | 7 | District | 122 |
|---|---|---|---|
| Ship From ID | L1575 | 3PD Job # | 114694 |
| Store Desc | ACME #1111 MT H | Deliver To | ANGELA BELL |
| Service Type | APPLIANCE | Address 1 | 250 MAIN STREET |
| Reference | 8058 | Address 2 | |
| Order Date | 10/20/2009 3:02:06 PM | City, State and Zip | HOMETOWN NJ 08000 |
| Last Update | 10/20/2009 3:02:06 PM | Phone | 609-555-1212 |
| Updated By | TouchTone | Delivery Date | 10/21/2009 |
| Driver | CC6359 JONES, JUAN | Promised Window | 10A - 2P |
| Carrier Name | JONES CARRYING | Arrival Time* | 3:14 PM |
| Order Exceptions | | | |
| Delivery Notes | | | |

Auto Survey Results

Immediately after the delivery was completed, the consumer was auto-called to take a quick satisfaction survey. The results of the survey are listed below. The scale is 1 to 5 on each question. If the consumer chose to leave a voicemail, a link to hear the voicemail is provided below.

| Question | Options | Answer |
|---|---|---|
| ACME CALL BEFORE | 1,2,3,4,5,* | 1 |
| OnTime | 1,2,3,4,5,* | 1 |
| Care personal prop | 1,2,3,4,5,* | 1 |
| ACME INSTALL | 1,2,3,4,5,* | 1 |
| Team Back | 1,2,3,4,5,* | 1 |
| Appearance | 1,2,3,4,5,* | 3 |
| Average | | 1.33 |

290

| Voicemail Link | l406 VM.wav |
|---|---|

Auto Survey Responses

If a consumer complained about the service or left a bad score (<3), the 3PD local delivery office contacted the consumer to follow up within two (2) hours of the survey. If the issue was caused by 3PD, then 3PD issued a gift card so that the consumer would return to the store. 3PD's follow up on the issue is documented below.

| UserID | Date/Time | Response Text | Closed? |
|---|---|---|---|
| jsmith | 10/21/2009 3:40 PM | {Voicemail Summary} The consumer would like a call back in order to tell someone in detail how rude that d/t was. | No |
| JBROWN | 10/21/2009 4:47 PM | {Passed to Store/Client} I did call and speak with the customer. Mrs. Bell stated that the driver was very rude to her. They purchased a refrigerator 4 years ago from ACME, and it was the same exact size as the one that was delivered today, and the driver came and walked into her home, and right away said it would not fit. Her husband asked him to measure, and it turned out to be a tight squeeze, but would fit, however they needed to remove the screen door. Our drivers don't remove the screen doors, so her husband removed the door. She told him it was the drivers job, but said the driver wouldn't do it, so her husband did. The delivery team took the door off the refrigerator and wanted to place it in their living room up against the furniture, which Mrs. Bell was not happy about. Then the delivery team got the refrigerator halfway through the door and argued with her husband about it not being able to go the rest of the way without scratching or damaging anything, and after a few minutes of that, the husband just said fine, just bring it in. Well, it did come in just fine, no damages done to anything. As they were hooking up the refrigerator, she said the delivery team was speaking to each other in Spanish, and she knew they were talking about her and cursing at her because her husband understands Spanish. She was extremely offended by this. She stated they had no care for her property, were very rude, and was extremely offended about them speaking about her in another language. I apologized on behalf of 3PD, and told her I would speak to the driver regarding his behavior in the hopes this situation would not repeat itself. She stated she would like a call from the store, in order to get the delivery charges refunded. I told her I would contact a manager there and have them call her. She thanked me for my concern. I called and spoke with the driver, Juan Jones stated he was at the customer's house for an hour and a half, the refrigerator was 28 3/4 and the space was 29 inches. | Yes |

*FIG. 22B*

Last Mile Delivery and Logistics Solutions

Acme Summary Quality Report
Report Run Date: 11/17/2009 11:32:57 AM
Date Range: 11/13/2009 To: 11/13/2009

| Date | PO# | Store # | Job# | VM | Overall Score | Call Before (Y/N) Score | # | On Time (Y/N) Score | # | Care for Home (Y/N) Score | # | Team Back (Y/N) Score | # | Appearance (1-5) Score | # | Test/Demo Score | # | Stops | Survey % |
|---|---|---|---|---|---|---|---|---|---|---|---|---|---|---|---|---|---|---|---|
| Acme NEW YORK | | | | 32 | 4.89 | 4.88 | 195 | 4.82 | 195 | 4.96 | 195 | 4.95 | 195 | 4.93 | 195 | 4.77 | 137 | 491 | 39.71 |
| ANDERS, FRANK | | | | 1 | 4.92 | 5.00 | 2 | 5.00 | 2 | 5.00 | 2 | 5.00 | 2 | 5.00 | 2 | 4.50 | 2 | 4 | 50.00 |
| 11/13/2009 | 76019 | A0692 | 1180394 | | 5.00 | 5.00 | 1 | 5.00 | 1 | 5.00 | 1 | 5.00 | 1 | 5.00 | 1 | 5.00 | 1 | | |
| 11/13/2009 | 2934 | A0692 | 1180391 | ... | 4.83 | 5.00 | 1 | 5.00 | 1 | 5.00 | 1 | 5.00 | 1 | 5.00 | 1 | 4.00 | 1 | | |
| ATTISON, GEORGE | | | | 1 | 5.00 | 5.00 | 5 | 5.00 | 5 | 5.00 | 5 | 5.00 | 5 | 5.00 | 5 | 5.00 | 5 | 9 | 55.56 |
| 11/13/2009 | 4213 | A1189 | 1180248 | ... | 5.00 | 5.00 | 1 | 5.00 | 1 | 5.00 | 1 | 5.00 | 1 | 5.00 | 1 | 5.00 | 1 | | |
| 11/13/2009 | 1585 | A1190 | 1180264 | | 5.00 | 5.00 | 1 | 5.00 | 1 | 5.00 | 1 | 5.00 | 1 | 5.00 | 1 | 5.00 | 1 | | |
| 11/13/2009 | 71112 | A1191 | 1180267 | | 5.00 | 5.00 | 1 | 5.00 | 1 | 5.00 | 1 | 5.00 | 1 | 5.00 | 1 | 5.00 | 1 | | |
| 11/13/2009 | ADD ON | A1192 | 1181447 | | 5.00 | 5.00 | 1 | 5.00 | 1 | 5.00 | 1 | 5.00 | 1 | 5.00 | 1 | 5.00 | 1 | | |
| 11/13/2009 | ADD ON | A1193 | 1181444 | | 5.00 | 5.00 | 1 | 5.00 | 1 | 5.00 | 1 | 5.00 | 1 | 5.00 | 1 | 5.00 | 1 | | |
| BOSTILLA, JON | | | | 1 | 4.60 | 5.00 | 2 | 3.00 | 2 | 5.00 | 2 | 5.00 | 2 | 5.00 | 2 | | | 4 | 50.00 |
| 11/13/2009 | ADD ON | A1624 | 1181778 | | 4.40 | 5.00 | 1 | 2.00 | 1 | 5.00 | 1 | 5.00 | 1 | 5.00 | 1 | | | | |
| 11/13/2009 | 97376 | A1624 | 1180293 | ... | 4.80 | 5.00 | 1 | 4.00 | 1 | 5.00 | 1 | 5.00 | 1 | 5.00 | 1 | 5.00 | 1 | | |
| CARRICO, JUAN | | | | 2 | 4.77 | 4.86 | 7 | 3.86 | 7 | 5.00 | 7 | 5.00 | 7 | 5.00 | 7 | 5.00 | 4 | 14 | 50.00 |
| 11/13/2009 | 76436 | A1957 | 1180284 | | 5.00 | 5.00 | 1 | 5.00 | 1 | 5.00 | 1 | 5.00 | 1 | 5.00 | 1 | 5.00 | 1 | | |
| 11/13/2009 | 73988 | A1958 | 1180287 | | 5.00 | 5.00 | 1 | 5.00 | 1 | 5.00 | 1 | 5.00 | 1 | 5.00 | 1 | | | | |
| 11/13/2009 | 76032 | A1961 | 1180334 | | 5.00 | 5.00 | 1 | 1.00 | 1 | 5.00 | 1 | 5.00 | 1 | 5.00 | 1 | 5.00 | 1 | | |
| 11/13/2009 | 76452 | A1962 | 1180332 | ... | 4.33 | 5.00 | 1 | 1.00 | 1 | 5.00 | 1 | 5.00 | 1 | 5.00 | 1 | 5.00 | 1 | | |
| 11/13/2009 | 76355 | A1963 | 1180285 | ... | 4.17 | 4.00 | 1 | 1.00 | 1 | 5.00 | 1 | 5.00 | 1 | 5.00 | 1 | 5.00 | 1 | | |

AUTO SURVEY RESULTS AND RESPONSES

Date Range: 11/18/2009 to 11/18/2009

Profit Centers: 556001 ACME LOS ANGELES 556002 ACME NEW YORK 556003 ACME CHICAGO -ONTARIO 556005 ACME - TORONTO 556007 ACME - N. CALIFORNIA

DAILY SURVEY RESULTS

| MARKET | | #DELVS | # SURV | %SURV | GOAL | TEAM BACK | APPEARANCE | ON TIME | CALL AHD | TEST/DEMO | PROF CRTSY | OVERALL |
|---|---|---|---|---|---|---|---|---|---|---|---|---|
| 556001 | ACME LOS ANGELES | 393 | 124 | 31.55 | 4.80 | 4.84 | 4.86 | 4.81 | 4.75 | 4.78 | 4.86 | 4.82 |
| 556002 | ACME NEW YORK | 441 | 192 | 43.54 | 4.80 | 4.85 | 4.89 | 4.80 | 4.87 | 4.61 | 4.90 | 4.83 |
| 556003 | ACME CHICAGO | 216 | 96 | 44.44 | 4.80 | 4.81 | 4.84 | 4.81 | 4.78 | 4.76 | 4.82 | 4.81 |
| 556004 | ACME LAS VEGAS | 66 | 33 | 50.00 | 4.80 | 5.00 | 5.00 | 4.82 | 4.91 | 5.00 | 4.97 | 4.95 |
| 556005 | ACME_TORONTO | 99 | 34 | 34.34 | 4.80 | 4.82 | 4.74 | 4.79 | 4.68 | 4.56 | 4.85 | 4.76 |
| 556007 | ACME_N. CALIFORNIA | 135 | 58 | 42.96 | 4.80 | 4.83 | 4.93 | 4.91 | 4.79 | 4.65 | 4.88 | 4.84 |
| Summary | | 1350 | 537 | 39.78 | 4.80 | 4.85 | 4.88 | 4.82 | 4.81 | 4.71 | 4.88 | 4.83 |

MONTH-TO-DATE SURVEY RESULTS (11/1/2009 - 11/18/2009)

| MARKET | | #DELVS | # SURV | %SURV | GOAL | TEAM BACK | APPEARANCE | ON TIME | CALL AHD | TEST/DEMO | PROF CRTSY | OVERALL |
|---|---|---|---|---|---|---|---|---|---|---|---|---|
| 556001 | ACME LOS ANGELES | 7150 | 2373 | 33.19 | 4.80 | 4.88 | 4.90 | 4.85 | 4.83 | 4.75 | 4.90 | 4.85 |
| 556002 | ACME NEW YORK | 8567 | 3288 | 38.38 | 4.80 | 4.89 | 4.91 | 4.85 | 4.87 | 4.73 | 4.90 | 4.86 |
| 556003 | ACME CHICAGO | 3924 | 1740 | 44.34 | 4.80 | 4.87 | 4.88 | 4.83 | 4.83 | 4.76 | 4.89 | 4.84 |
| 556004 | ACME LAS VEGAS | 1287 | 573 | 44.52 | 4.80 | 4.95 | 4.95 | 4.90 | 4.92 | 4.89 | 4.96 | 4.93 |
| 556005 | ACME_TORONTO | 1778 | 549 | 30.88 | 4.80 | 4.84 | 4.87 | 4.84 | 4.78 | 4.58 | 4.85 | 4.81 |
| 556007 | ACME_N. CALIFORNIA | 2614 | 1032 | 39.48 | 4.80 | 4.90 | 4.91 | 4.91 | 4.87 | 4.78 | 4.93 | 4.88 |
| Summary | | 25320 | 9555 | 37.74 | 4.80 | 4.88 | 4.90 | 4.85 | 4.85 | 4.75 | 4.90 | 4.86 |

RESPONSE CLASSIFICATION MATRIX

| DISTRICT | | #DELVS | # SURV | 3PD Scheduling Issue | Bad Phone Number | Contract Carrier Issue | Notification /Schedule | Product - Damaged Product | Service - Wrong Address | Store/Client Issue | Other - See Documentation in Notes | Total Classifications |
|---|---|---|---|---|---|---|---|---|---|---|---|---|
| 556001 | ACME LOS ANGELES | 393 | 124 | 0 | 0 | 0 | 2 | 1 | 0 | 1 | 2 | 6 |
| 556002 | ACME NEW YORK | 441 | 192 | 0 | 0 | 1 | 4 | 0 | 0 | 0 | 5 | 10 |
| 55600 | ACME CHICAGO | 216 | 96 | 3 | 1 | 2 | 1 | 1 | 0 | 0 | 2 | 10 |
| 556005 | ACME_TORONTO | 99 | 34 | 0 | 0 | 0 | 1 | 0 | 1 | 1 | 2 | 5 |
| 556007 | ACME_N. CALIFORNIA | 135 | 58 | 0 | 0 | 2 | 0 | 0 | 0 | 0 | 4 | 6 |

*FIG. 24*

OPEN SURVEY RESPONSES

| JOB # / CUSTOMER PO | DELIVER TO | CLASSIFICATION(S) | SCORE | AGE (H) | VM FILE | DETAILS |
|---|---|---|---|---|---|---|
| 556001 ACME - LOS ANGELES | | | | | | |
| 55742 ACME #17 | | | | | | |
| 118992 | SNOWE, FRANK | | 2.3 | 18.0 | | |
| CUST REF #: 742 | | CC117  WATERS, JENNY | | | | Details |
| JONES: {Left VM for Consumer} Left message for customer - provided office # to call back. – Spoke to CC who said that there were in issues. He felt that he actually went out of his way to please this customer. Informed him that I would be call him back once I hear from the customer | | | | | | |
| 556002 ACME  NEW YORK | | | | | | |
| 55674 ACME #16 | | | | | | |
| 118875 | BECKER, GREG | Other - See Documentation in Notes, Contract Carrier Issue, Store/Client Issue | 2.6 | 15.1 | Listen | Details |
| CUST REF #: 205 | | CC00029  JONES, JANICE | | | | |
| BBROWN: The customer was not happy about his merchandise not being properly covered and protected while being delivered. He said that even though he purchased them on sale they should still receive the same service and protect the product from being damaged while in route. Otherwise he would have picked them up himself. | | | | | | |

CLOSED SURVEY RESPONSES

| JOB # / CUSTOMER PO | DELIVER TO | CLASSIFICATION(S) | SCORE | AGE (H) | VM FILE | DETAILS |
|---|---|---|---|---|---|---|
| 556001 ACME  LOS ANGELES | | | | | | |
| 55048 ACME #10 | | | | | | |
| 118898 | BROWN, CYNTHIA | | 3.7 | 4.8 | Listen | Details |
| CUST REF #: 166 | | CE104  SMITH, SAM | | | | |
| [FFRANKLIN] (Voicemail Summary) The consumer says the call she received last night was too late. She also says she was told a different time by the store. She says she was inconvenienced by this. [BBROW  {Spoke With Consumer} Spoke to customer and apologized about the mix up on the T/F. I look at what the store faxed over and there was no specific time requested by the store. | | | | | | |
| 55555 ACME #15 | | | | | | |
| 118899 | MASTER, MARK | Notification / Schedule, Store/Client Issue | 5.0 | 2.6 | Listen | Details |
| CUST REF #: 935 | | CE000103  WASHINGTON, BRENDA | | | | |
| [FFRANKLIN] (Voicemail Summary) The consumer says the delivery was scheduled for the wrong day. He is not satisfied with the mix up. [JONES] {Passed to Store/Client}, {Spoke With Consumer}, {ISSUE PASSED TO: Harrold} Spoke with customer who said that the delivery team was wonderful. The only problem was that when he scheduled his delivery, he wanted to be delivered later in the week. He felt like the delivery was forced upon him when he was not ready. He is upset with the store. I apologized and let him know that I would contact a manager at the store to inform them of his complaint and poor service. -- Informed MOD Harrold of the customer's experience | | | | | | |

*FIG. 25*

Acme Summary Quality Report
Report Run Date: 11/17/2009 11:32:57 AM
Date Range: 11/13/2009 To: 11/13/2009

Last Mile Delivery and Logistics Solutions

| Summary | Overall Score | Call Before (Y/N) Score | # | On Time (Y/N) Score | # | Care for Home (Y/N) Score | # | Team Back (Y/N) Score | # | Appearance (1-5) Score | # | Test/Demo Score | # | Stops | Survey % |
|---|---|---|---|---|---|---|---|---|---|---|---|---|---|---|---|
| Acme NEW YORK | 4.89 | 4.88 | 195 | 4.82 | 195 | 4.96 | 195 | 4.95 | 195 | 4.93 | 195 | 4.77 | 137 | 491 | 39.71 |
| A0692 - Acme #0692 | 4.92 | 5.00 | 2 | 5.00 | 2 | 5.00 | 2 | 5.00 | 2 | 5.00 | 2 | 4.50 | 2 | 5 | 40.00 |
| A0751 - Acme #0751 | 5.00 | 5.00 | 3 | 5.00 | 3 | 5.00 | 3 | 5.00 | 3 | 5.00 | 3 | 5.00 | 3 | 7 | 42.86 |
| A1034 - Acme #1034 | 4.96 | 5.00 | 4 | 5.00 | 4 | 5.00 | 4 | 5.00 | 4 | 5.00 | 4 | 4.75 | 4 | 15 | 26.67 |
| A1035 - Acme #1035 | 4.64 | 4.50 | 2 | 4.50 | 2 | 4.50 | 2 | 5.00 | 2 | 4.50 | 2 | 5.00 | 1 | 9 | 22.22 |
| A1046 - Acme #1046 | 4.99 | 5.00 | 13 | 5.00 | 13 | 5.00 | 13 | 5.00 | 13 | 5.00 | 13 | 4.90 | 10 | 19 | 68.42 |
| A1106 - Acme #1106 | 5.00 | 5.00 | 1 | 5.00 | 1 | 5.00 | 1 | 5.00 | 1 | 5.00 | 1 | 5.00 | 1 | 13 | 7.69 |
| A1149 - Acme #1149 | 4.78 | 4.67 | 3 | 5.00 | 3 | 5.00 | 3 | 5.00 | 3 | 5.00 | 3 | 3.67 | 3 | 4 | 75.00 |
| A1185 - Acme #1185 | 5.00 | 5.00 | 2 | 5.00 | 2 | 5.00 | 2 | 5.00 | 2 | 5.00 | 2 | 5.00 | 2 | 5 | 40.00 |
| A1192 - Acme #1192 | 4.68 | 4.67 | 6 | 3.83 | 6 | 5.00 | 6 | 4.83 | 6 | 4.83 | 6 | 5.00 | 4 | 16 | 37.50 |
| A1194 - Acme #1194 | 5.00 | 5.00 | 1 | 5.00 | 1 | 5.00 | 1 | 5.00 | 1 | 5.00 | 1 | 5.00 | 1 | 5 | 20.00 |
| A1512 - Acme #1512 | 4.88 | 4.33 | 3 | 5.00 | 3 | 5.00 | 3 | 5.00 | 3 | 5.00 | 3 | 5.00 | 2 | 15 | 20.00 |
| A1535 - Acme #1535 | 5.00 | 5.00 | 5 | 5.00 | 5 | 5.00 | 5 | 5.00 | 5 | 5.00 | 5 | 5.00 | 3 | 15 | 33.33 |
| A1542 - Acme #1542 | 4.94 | 5.00 | 6 | 5.00 | 6 | 5.00 | 6 | 5.00 | 6 | 5.00 | 6 | 4.50 | 4 | 12 | 50.00 |
| A1548 - Acme #1548 | 4.91 | 5.00 | 6 | 5.00 | 6 | 5.00 | 6 | 4.83 | 6 | 5.00 | 6 | 4.33 | 3 | 9 | 66.67 |
| A1567 - Acme #1567 | 5.00 | 5.00 | 1 | 5.00 | 1 | 5.00 | 1 | 5.00 | 1 | 5.00 | 1 | | | 4 | 25.00 |
| A1575 - Acme #1575 | 4.89 | 4.75 | 8 | 5.00 | 8 | 5.00 | 8 | 5.00 | 8 | 5.00 | 8 | 4.50 | 6 | 17 | 47.06 |
| A1583 - Acme #1583 | 4.90 | 4.90 | 10 | 4.90 | 10 | 4.90 | 10 | 4.90 | 10 | 4.90 | 10 | 4.89 | 9 | 15 | 66.67 |
| A1608 - Acme #1608 | 5.00 | 5.00 | 3 | 5.00 | 3 | 5.00 | 3 | 5.00 | 3 | 5.00 | 3 | 5.00 | 2 | 11 | 27.27 |
| A1624 - Acme #1624 | 4.92 | 5.00 | 12 | 4.67 | 12 | 5.00 | 12 | 5.00 | 12 | 5.00 | 12 | 4.80 | 5 | 24 | 50.00 |
| A1656 - Acme #1656 | 4.78 | 4.00 | 4 | 4.75 | 4 | 5.00 | 4 | 5.00 | 4 | 4.90 | 4 | 5.00 | 3 | 10 | 40.00 |
| A1658 - Acme #1658 | 5.00 | 5.00 | 4 | 5.00 | 4 | 5.00 | 4 | 5.00 | 4 | 5.00 | 4 | 5.00 | 4 | 12 | 33.33 |
| A1670 - Acme #1670 | 5.00 | 5.00 | 5 | 5.00 | 5 | 5.00 | 5 | 5.00 | 5 | 5.00 | 5 | 5.00 | 4 | 11 | 45.45 |
| A1674 - Acme #1674 | 4.49 | 4.60 | 10 | 4.20 | 10 | 4.50 | 10 | 4.60 | 10 | 4.50 | 10 | 4.57 | 7 | 37 | 27.03 |

FIG. 26

TRIGGERING AND CONDUCTING AN AUTOMATED SURVEY

CROSS-REFERENCE TO RELATED APPLICATIONS

This application is a continuation of U.S. patent application Ser. No. 14/746,207, filed Jun. 22, 2015, which is a continuation of U.S. patent application Ser. No. 12/722,455, filed Mar. 11, 2010, which claims the benefit of U.S. Provisional Application No. 61/266,599, filed Dec. 4, 2009, the entire disclosures of which are hereby incorporated by reference herein.

This application is related to U.S. Pat. No. 8,515,803, filed Sep. 26, 2011, titled "Triggering and Conducting an Automated Survey," and issued on Aug. 20, 2013, the entire disclosure of which is hereby incorporated by reference herein.

TECHNICAL FIELD

The present disclosure generally relates to surveys, and more particularly relates to survey automation.

BACKGROUND

Businesses often use surveys to obtain feedback from customers. The survey responses can help a business understand the customer's level of satisfaction. Also, a business can use data from surveys to track patterns and trends in customer service. In response, the business can make changes as necessary in areas where improvements can be made. Businesses that can keep operations running smoothly and focused on customer satisfaction may typically have a better chance of long-term success.

SUMMARY

The present disclosure describes various systems and methods for conducting an automated survey. According to some implementations, a computer-readable medium may be encoded with computer-executable instructions, wherein the computer-executable instructions include logic adapted to receive a notification of the occurrence of a trigger event associated with a service performed for a customer. The computer-executable instructions may further include logic adapted, in response to receiving the notification, to initiate an automated survey to be offered to a survey recipient. Additional logic is adapted to conduct the automated survey. The instructions also include logic adapted to receive survey result information from the survey recipient in response to the automated survey.

According to some implementations, a computer implemented method may include receiving a notification of the occurrence of a trigger event associated with a service performed for a customer. In response to receiving the notification, the method may include initiating an automated survey to be offered to a survey recipient and conducting the automated survey. Also, the method may include receiving survey result information from the survey recipient in response to the automated survey.

Some embodiments of the present disclosure may include an automated survey system, which may comprise, for example, an interface device configured to receive a notification of the occurrence of a trigger event associated with a service performed for a customer. The survey system may also comprise a processing device configured to initiate an automated survey to be offered to a survey recipient in response to receiving the notification. The processing device may be further configured to conduct the automated survey via the interface device and receive survey result information from the survey recipient in response to the automated survey.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 11 is a screen shot of a user interface for creating an automated survey according to various implementations of the present disclosure.

FIG. 12 is a diagram illustrating a sample script for an automated survey according to various implementations of the present disclosure.

FIGS. 18A and 18B include combinable parts of a screen shot of a user interface for enabling input of follow-up actions according to various implementations of the present disclosure.

FIG. 19 is a screen shot of a user interface for enabling access to survey result information according to various implementations of the present disclosure.

FIG. 20 is a screen shot of the user interface of FIG. 19 according to various implementations.

FIG. 21 is a screen shot of a user interface for searching and tracking survey responses according to various implementations of the present disclosure.

FIGS. 22A and 22B are screen shots of a service issue report according to various implementations of the present disclosure.

FIG. 23 is a screen shot of a quality report according to various implementations of the present disclosure.

FIG. 24 is a screen shot of a survey result report according to various implementations of the present disclosure.

FIG. 25 is a screen shot of a survey response report according to various implementations of the present disclosure.

FIG. 26 is a screen shot of a summary quality report according to various implementations of the present disclosure.

DETAILED DESCRIPTION

The present disclosure describes systems and methods for conducting surveys in response to interactions between businesses and customers. Surveys may be created and utilized for obtaining feedback about products sold to customers and/or about services provided for the customers. Although various implementations of the present disclosure are described with respect to surveys conducted in response to a service, the survey systems and methods herein may also be configured to be conducted in response to products or other offerings by a company or business. In addition, various implementations herein describe many services as being delivery services, but it should be understood that the present disclosure also may include other types of services without departing from the principles described herein. Other features and advantages will be apparent to one of ordinary skill in the art upon consideration of the general principles described herein, and all such features and advantages are intended to be included in the present disclosure.

Figure 1:
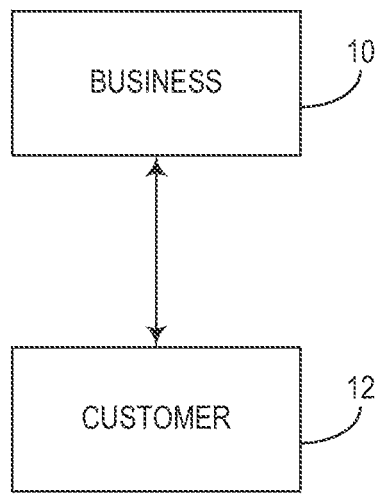
FIG. 1 is a block diagram illustrating a first embodiment of general business interactions.

FIG. 1 is a block diagram of a business interaction between a business 10 and a customer 12. The business 10 may be any company, profit center, or other entity. The business 10 may be a physical store, on-line store, service company, or other entity. The customer 12 may be any individual who is to receive a service or who orders or purchases a product. In such an interaction as illustrated in FIG. 1, the business 10 provides goods and/or services directly to the customer 12. During this interaction, there are several opportunities for the business 10 to display customer service, including, for example, the customer 12 interacting with a salesperson, sales clerk, or cashier, the customer 12 receiving a service, such as a repair, maintenance, improvement, legal service, delivery or other type of service, or other types of interactions. When a service is to be performed in this arrangement, the business 10 employs internal servicers who provide the service directly to the customer 12. Various examples of non-limiting services may include a delivery of a purchased product, a plumbing service, tax return preparation, automobile repair, etc.

Figure 2:
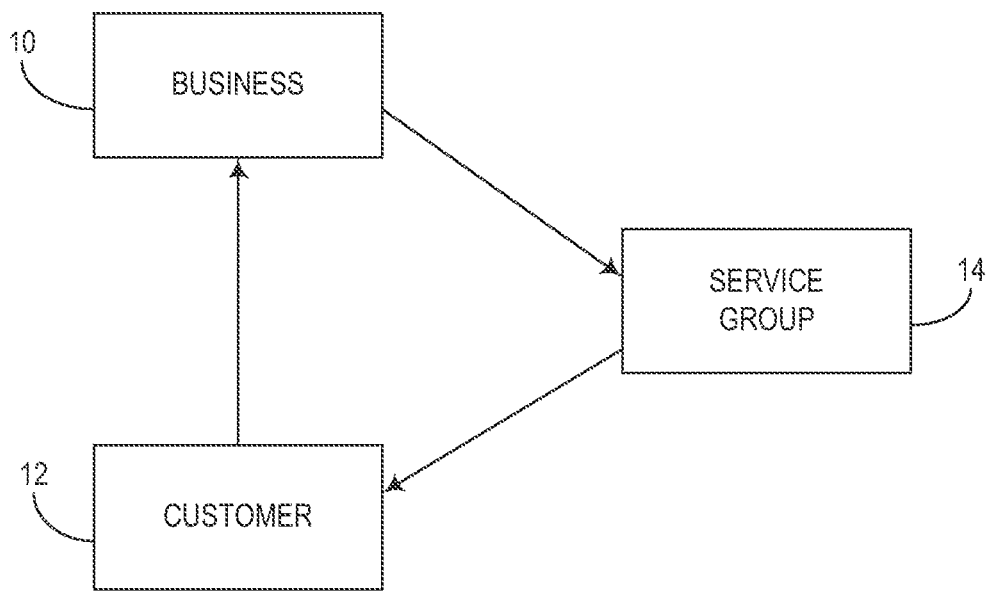
FIG. 2 is a block diagram illustrating a second embodiment of general business interactions.

FIG. 2 shows another example of a general business interaction in which the customer 12 pays the business 10 for goods or services, the business 10 provides a service group 14 with information for fulfilling the service, and the service group 14 provides the service to the customer 12 on behalf of the business 10. The service group 14 includes the service professionals and other people involved in the business of offering one or more services, and is often a separate corporate entity from the business 10. For example, the service group 14 may be responsible for delivering, building, assembling, installing, maintaining, repairing, improving, testing, demonstrating, removing, and/or other service actions. In the arrangement of FIG. 2, the business 10 may be considered a client of the service group 14.

According to various implementations, the customer 12 may provide the business 10 with personal information, such as name, address, phone numbers, e-mail addresses, etc., which can be used for contacting the customer 12 to provide the intended services or for contacting the customer 12 as needed. Other ordering information may be exchanged or created, including special instructions for delivery, unpacking or assembly requests, and/or installation requests. Orders can usually be taken in any number of ways, including transactions in person, by phone, by mail, by e-mail, by the Internet, or by other ordering methods. The business 10 may provide some of this order information to the service group 14 in order that the service group 14 can perform the service properly. The order information can be provided by an automatic ordering system, by facsimile device, by e-mail, by phone, or in any other manner. The service group 14 may pick up products, as necessary, from the business's store, warehouse, supplier, etc., and deliver the products to one or more customers 12. In some embodiments, the customer 12 may schedule the service directly with the service group 14.

Figure 3:
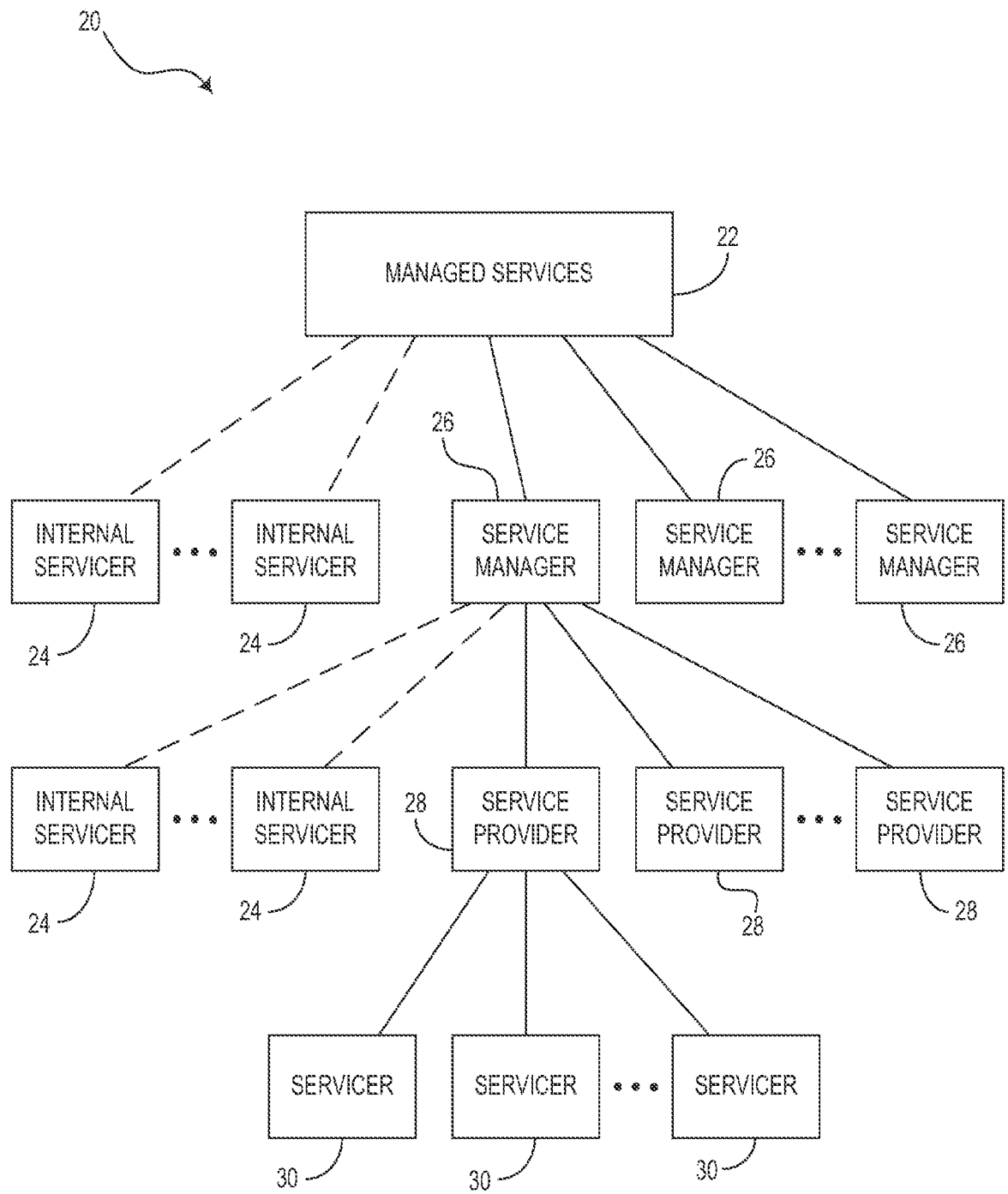
FIG. 3 is a block diagram illustrating an embodiment of a service group according to various implementations of the present disclosure.

FIG. 3 is a block diagram showing an embodiment of a service group 20, such as the service group 14 shown in FIG. 2. In this implementation, managed services 20 may represent a service company, which may be responsible for the management of internal servicers 24, who are employed by a client business, and service managers 26, who may be employed by the managed services 22 company or may be independent contract companies. In some cases, the managed services 22 may include operators who manage the services for a particular client. In other implementations, servicers 30 may be direct independent contractors to managed services 22. According to various implementations of the present disclosure, the managed services 22 may include an automated survey system, which automatically conducts surveys and analyzes the results of the survey. More details of the automated survey systems are described below.

The service managers 26 may be field managers, regional managers, or local managers who manage one or more service providers 28, often in a particular region and/or for a specific client. The service manager may also manage one or more internal servicers 24. The service providers 28 manage a number of servicers 30, who may be employed by the service providers 28 or may be independent contractors. The servicer 30 may be the individual or team representing the service group 20 (or service group 14 shown in FIG. 2) and who directly interacts with the customer 12.

Figure 4:
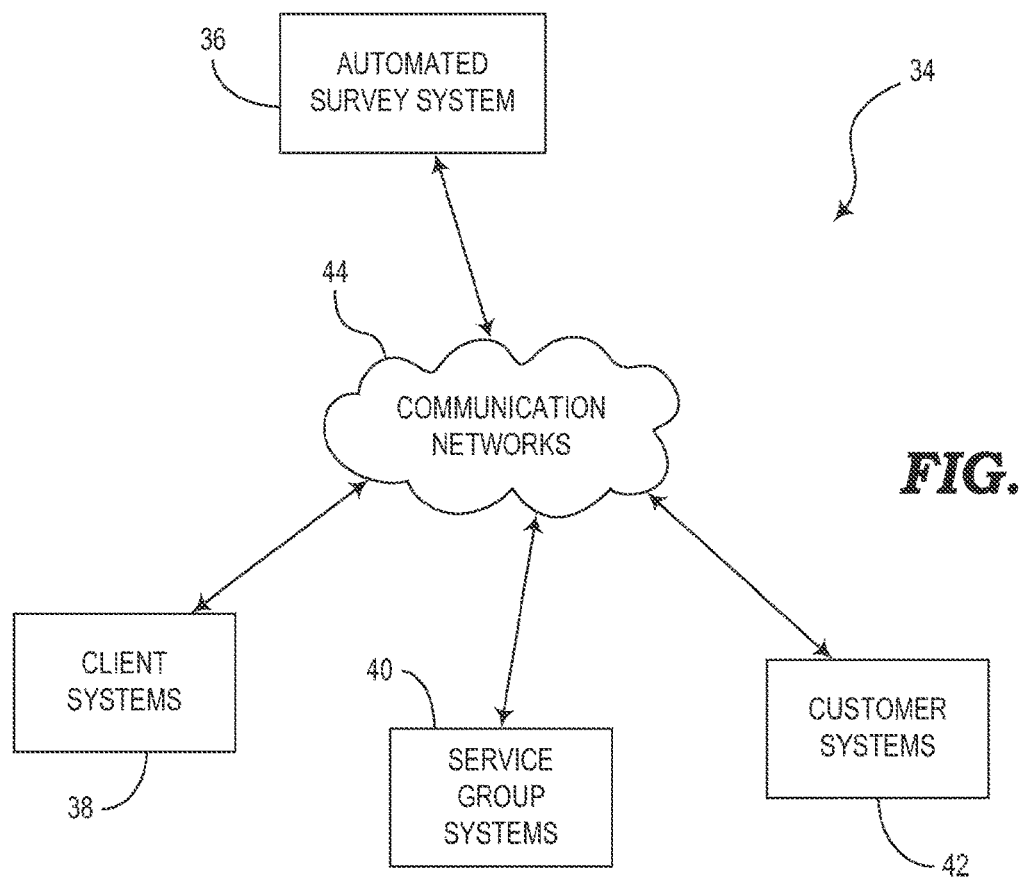
FIG. 4 is a block diagram illustrating a survey network system according to various implementations of the present disclosure.

FIG. 4 is a block diagram of an embodiment of a survey network system 34 according to various implementations of the present disclosure. The survey network system 34 includes an automated survey system 36 (described in more detail below), client systems 38, service group systems 40, and customer systems 42. These and other systems are capable of interacting and communicating via one or more communication networks 44. The communication networks 44 may include telephone lines, such as land line or public switched telephone network (PSTN) systems, mobile phone channels and systems, communication channels for exchanging data and information, such as a local area network (LAN), wide area network (WAN), the Internet, or other data, communication, or telecommunication networks.

The client systems 38 may represent any business, such as the businesses described with respect to FIGS. 1 and 2. In the environment of the survey network system 34 of FIG. 4, the client systems 38 represent at least a part of a business that is a client of the service group, which utilizes the service group systems 40. The service group may be responsible for performing one or more services on behalf of the clients. The service group may be the service group 20 described with respect to FIG. 3 or other group of servicers, service providers, service managers, and/or managed services. In some embodiments, the automated survey system 36 may be part of the client systems 38 or may be part of the service group systems 40. As suggested in FIG. 1, the client systems 38 and service group systems 40 may be part of one company or enterprise.

According to various embodiments of FIG. 4, the service group systems 40 may include equipment used by the servicers and by field managers. For example, the service group systems 40 may include handheld devices (e.g., devices carried by the servicers), mobile phones, laptop computers, or other devices. When the servicer completes a service, the servicer may use any suitable device of the service group systems 40 to notify the automated survey system 36 that the service has been completed. For example, the servicer may call into an integrated voice response (IVR) device (or voice response unit (VRU)) of the automated survey system 36 to input information about the service or completion of the service. Another example may include a telephone call, landline or mobile, to a support agent, who may be associated with the automated survey system 36 and who can manually enter the service information into the automated survey system 36. In some implementations, completion of the particular service may be communicated by some automated process, such as the automatic detection of a change in the servicer's location using, for example, a global positioning system (GPS) device.

After notification of service completion has been received, the automated survey system 36 waits for a short amount of time (e.g., to allow the customer to reflect upon the service received). After a configurable short delay, e.g., about 10 minutes, the automated survey system 36 launches an automated survey. In some implementations, the survey is conducted over the telephone using an IVR system, which is configured to call the customer's home telephone number using contact information obtained during the order process. The survey may be sent to the customer systems 42 using the PSTN or over other communication networks, such as an e-mail system, chat session, text message system, etc. In some cases, the customer may delegate another individual to interact with the servicers, such as if the customer wishes for a neighbor to handle the acceptance of the delivered items. In these cases, the survey recipient may be the neighbor, who may be in a better position to rate the delivery service.

In some implementations, the automated survey system 36 may include a processing system adapted to conduct the survey when the service is complete. The automated survey system 36 is further configured to analyze the results of the survey to determine if any follow-up actions with the customer are needed. For example, if the customer is dissatisfied with the service received, the customer can leave responses that can be analyzed for follow-up. In some situations, the customer may have need of immediate resolution to which the service group or client can provide follow up. Feedback may be received in the form of key strokes on a touch tone key pad of a telephone, voice messages left over the telephone, and/or by other communication means.

Some follow-up actions may involve a service manager, field manager, or other representative of the service group. The automated survey system 36 organizes the survey results in tables or charts to clearly communicate any issues that the customers may have. For example, if the customer indicates poor service, such as by providing low ratings on the survey or by explaining problems in a voice message, this information can be automatically or manually recorded and then provided directly to the service manager or other responsible person or team of the service group associated with the service group systems 40. In some cases, survey feedback can be directed to the client systems 38. In the case where follow-up actions may involve the client, the automated survey system 36 may send an automatic communication to the client systems 38 in order that the client can view the survey result information using a web-enabled browser via the Internet. Both the client and field managers of the service group can access survey result information and/or a digitized version of the voice message as needed to help resolve the customer's issues.

Figure 5:
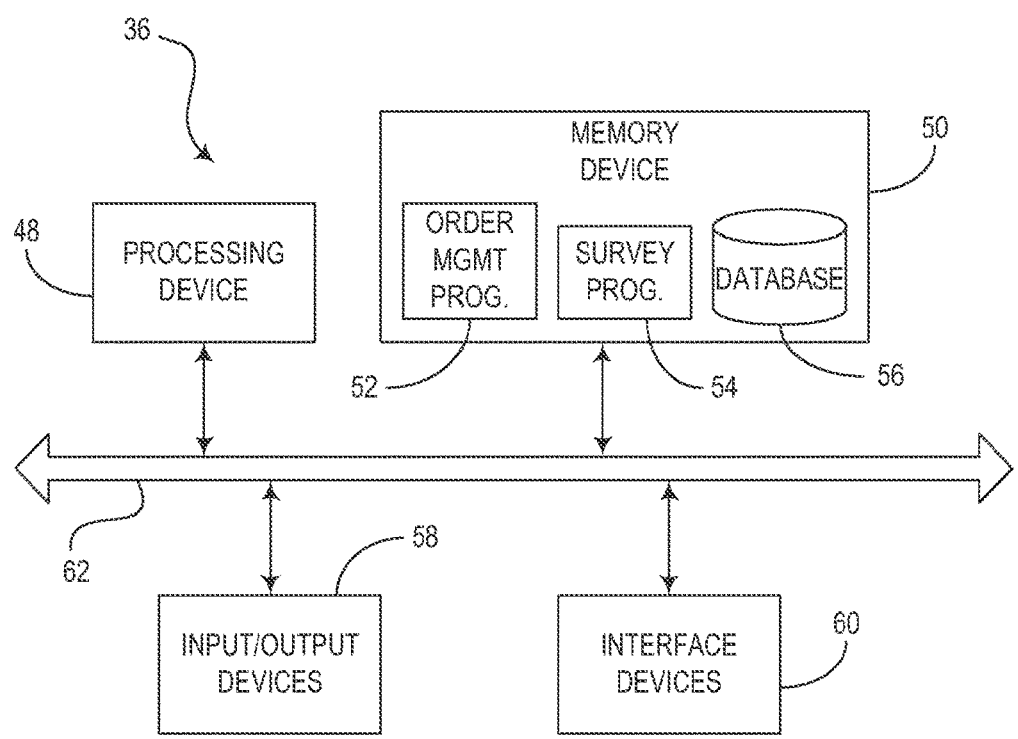
FIG. 5 is a block diagram illustrating an embodiment of the automated survey system shown in FIG. 4, according to various implementations of the present disclosure.

FIG. 5 is a block diagram illustrating an embodiment of the automated survey system 36 shown in FIG. 4, according to various implementations of the present disclosure. As shown in this embodiment, the automated survey system 36 includes a processing device 48 and a memory device 50, which includes at least an order management program 52, a survey program 54, and a database 56. The automated survey system 36 further includes input/output devices 58 and interface devices 60. The components of the automated survey system 36 are interconnected and may communicate with each other via a computer bus interface 62 or other suitable communication devices.

In some embodiments, each component of the automated survey system 36 as shown may include multiple components on multiple computer systems of a network. For example, the managed services 22 of the service group may comprise servers, such as application servers, file servers, database servers, web servers, etc., for performing various functions described herein. The servers of the automated survey system 36 may for example be physically separate servers or servers in a VMware ESXi 4.0 virtual environment, among other implementations. In addition, the internal servicers 24, service managers 26, service providers 28, and/or servicers 30 may comprise laptop or desktop computer systems, which may form part of the automated survey system 36 and may be used for accessing the servers as needed.

The processing device 48 may be one or more general-purpose or specific-purpose processors or microcontrollers for controlling the operations and functions of the automated survey system 36. In some implementations, the processing device 48 may include a plurality of processors, computers, servers, or other processing elements for performing different functions within the automated survey system 36.

The memory device 50 may include one or more internally fixed storage units, removable storage units, and/or remotely accessible storage units, each including a tangible storage medium. The various storage units may include any combination of volatile memory and non-volatile memory. For example, volatile memory may comprise random access memory (RAM), dynamic RAM (DRAM), etc. Non-volatile memory may comprise read only memory (ROM), electrically erasable programmable ROM (EEPROM), flash memory, etc. The storage units may be configured to store any combination of information, data, instructions, software code, etc. The order management program 52, survey program 54, and database 56 may be stored in one or more memory devices 50 and run on the same or different computer systems and/or servers.

The input/output devices 58 may include various input mechanisms and output mechanisms. For example, input mechanisms may include various data entry devices, such as keyboards, keypads, buttons, switches, touch pads, touch screens, cursor control devices, computer mice, stylus-receptive components, voice-activated mechanisms, microphones, cameras, infrared sensors, or other data entry devices. Output mechanisms may include various data output devices, such as computer monitors, display screens, touch screens, audio output devices, speakers, alarms, notification devices, lights, light emitting diodes, liquid crystal displays, printers, or other data output devices. The input/output devices 58 may also include interaction devices configured to receive input and provide output, such as dongles, touch screen devices, and other input/output devices, to enable input and/or output communication.

The interface devices 60 may include various devices for interfacing the automated survey system 36 with one or more types of communication systems, such as the communication networks 44. The interface devices 60 may include devices for communicating the automated survey from the automated survey system 36 to the customer systems 42. For example, when the survey is communicated via telephone, a telephone/voice interface device of the interface devices 60 can be used for controlling an IVR device and accessing a telephone network. Also, interface devices 60 may include various devices for interfacing with a data network, such as the Internet, to enable the communication of data. In some examples, the interface devices 60 may include Dialogic cards, Dialogic Diva softIP software, Envox, a voice over Internet protocol (VoIP) device, or other hardware or software interface elements.

The order management program 52 stored in the memory device 50 includes any suitable instructions for processing a customer order. For example, the order management program 52 may be Dispatch Office or other software for managing orders. In some implementations, the order management program 52 may include the capability of tracking deliveries. The order management program 52 may be omitted from the automated survey system 36 in some embodiments or placed in a separate processing system according to other embodiments.

The survey program 54, which is described in more detail below, includes instructions and templates for enabling a user to create an automated survey. The survey program 54 is also configured to detect a trigger event, such as the completion of a delivery service, and then launch the automated survey in response to the trigger. The survey program 54 also may automatically analyze the feedback from the survey recipient and enable a survey monitor person to review voice messages left by the survey recipient and enter notes, a summary, and/or a transcript of the voice message.

When the analysis of the survey result information is made, the survey program 54 can determine if follow-up actions are warranted. For example, if a delivered product is damaged, the survey program 54 can communicate with the appropriate person or team that can resolve the issue. The survey program 54 utilizes, as needed, the database 56, which is configured to store order information, customer information, survey information, and other types of data and information. Other implementations may omit one or more of the functions disclosed herein.

Figure 6:
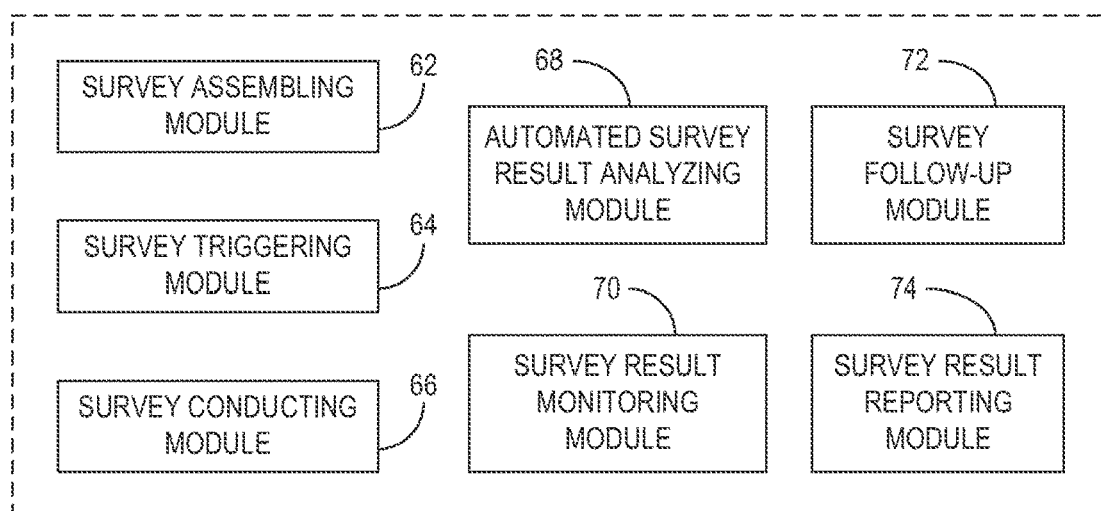
FIG. 6 is a block diagram illustrating an embodiment of the survey program shown in FIG. 5, according to various implementations of the present disclosure.

FIG. 6 is a block diagram showing an embodiment of the survey program 54 according to various implementations of the present disclosure. As illustrated in FIG. 6, according to some embodiments, the survey program 54 includes a survey assembling module 62, a survey triggering module 64, a survey conducting module 66, an automated survey result analyzing module 68, a survey result monitoring module 70, a survey follow-up module 72, and a survey result reporting module 74. In some implementations, certain functions described herein may be executed by the module explicitly described or may alternatively be executed by one or more modules.

The survey assembling module 62 is configured to record a survey script read by a professional speaker. The survey assembling module 62 can record the read script in digitized form in a way file, vox file, and/or other audio file formats. A file naming convention can be used to help identify the properties of the survey scripts. For example, the file name may include an indication of the client, product, types of services, spoken language, store brand, and/or other information. When the scripts are recorded, the survey assembling module 62 enables a user to select different scripts to combine into a complete survey. In this respect, each script may be a single question, single statement, or other portion of an entire survey. The user may then arrange the selected scripts in a particular order. Also, the user is enabled to enter acceptable answers for each of the survey questions.

The survey triggering module 64 detects when a trigger event occurs that warrants the conducting of a survey. For example, the trigger event may be the completion of a delivery service or other service. In some embodiments, the survey triggering module 64 may detect when an order case is closed or when the status of a customer's order has been closed or finished (e.g., when an order has been fulfilled and properly delivered). The survey triggering module 64 may detect the order status using a polling process in which the database 56 is polled. The polling process may be operated on a periodic schedule, e.g., about every 10 minutes. When the order case is detected as being closed, the survey triggering module 64 may create a new survey case to indicate that a survey is to be launched. According to some embodiments, the survey triggering module 64 may detect when a survey record has been created automatically or manually in the database 56.

In some embodiments, the survey triggering module 64 may be configured to receive indications when trigger events occur that warrant the initiation of surveys. For example, when a service is complete, the servicer may use a handheld device that prompts the servicer to provide input when the service job is finished. The handheld device may transmit a wireless signal to the automated survey system 36 via the interface devices 60 and this signal may be forwarded to the survey triggering module 64. Some embodiments may also include a purchased product (e.g., a mobile phone, smart phone, cable service, etc.) that may be configured to automatically communicate notification of a trigger event (e.g., installation, registration, initiation of phone service, etc.) to the survey triggering module 64. Other trigger events and other means of communicating a notification of the trigger events to the survey triggering module 64 may be used according to the particular design.

When the survey triggering module 64 determines that an authentic trigger event has occurred, the survey triggering module 64 may then set a flag stored in the memory device 50 or provide some other type of indication that the service job is complete (or other trigger event has occurred) and that the status of a new survey case associated with that service job is now opened. In some implementations, the survey triggering module 64 may enter the time that the trigger signal was received in order to allow multiple service jobs to be recorded chronologically according to completion time.

The survey triggering module 64 may also be configured to perform a polling process in which the database 56 is polled to determined which entries were recorded over a past predetermined time period. For example, if surveys are to be initiated every ten minutes, the polling process can determine which service jobs were completed in the last ten minutes. The survey triggering module 64 places the polled service jobs in the scheduling queue 84 in the order in which the service jobs were completed. The order that the automated surveys are conducted is based in part on the list in the survey scheduling queue 84.

The survey triggering module 64 may also be configured to wait a predetermined amount of time before triggering the launch of the survey. The reason for the delay is to allow the customer to have time to observe the delivered product and try running it, for example, to determine if there are any defects. Also, the delay permits time for the servicer to leave the vicinity of the customer's residence to allow the customer to provide unbiased responses to the survey questions. When the predetermined lag time has elapsed, the survey triggering module 64 instructs the survey conducting module 66 to launch the survey.

In response to a trigger to launch, the survey conducting module 66 is configured to retrieve the appropriate survey script for the particular client, brand, product, service, customer, order, or other criteria. Also, the survey conducting module 66 retrieves the customer contact information, such as a home telephone number or mobile phone number. The survey conducting module 66 may be configured to control the IVR device to dial the customer's number and begin playing the survey scripts when the customer answers the phone. In some embodiments, other methods of contacting the customer may be used.

The survey conducting module 66 is also configured to capture the touch tone entries from the customer's telephone in response to the survey questions. Customer input can also be captured by the survey conducting module 66 using other input techniques, such as by e-mail, web-based inputs, spoken answers, etc. The survey conducting module 66 also gives the customer an option to leave a voice message, if desired. When a voice message is left, the survey conducting module 66 may also record the message in digital form. In some embodiments, the survey conducting module 66 may also be configured to give the customer the option of speaking with a live operator. If the customer wishes to speak with an operator, the survey conducting module 66 may redirect the call to an operator associated with the service group. The survey conducting module 66 may also be configured to give the customer the option to leave a message using text, such as typing a message in an e-mail, typing a message in a text message, typing a message on a smart phone, using a chat session, or other means of leaving a non-voice message.

When the survey is finished, the survey result information and voice messages can be analyzed to determine the customer's satisfaction with the service received. Some analysis of this information may be done automatically, while other analysis may require human involvement.

The automated survey result analyzing module 68 is configured to automatically analyze the feedback from the customer when the survey is completed. For example, the survey may include any number of questions, any of which may require numeric answers, such as answers on a numeric scale from 1 to 5, where 1 represents "completely dissatisfied" and 5 represents "completely satisfied." Other scales can be used according to the particular design. The automated survey result analyzing module 68, according to some implementation, may be configured to calculate a score of the survey recipient's numeric answers.

All the scores on the five-point scale can be averaged together to determine an overall score for the survey. The automated survey result analyzing module 68 may be configured to use the overall score to determine if it is below a threshold that indicates that the customer was generally dissatisfied with the service. With a low average score, such as if the score is below 3.0 on a scale from 1 to 5, the automated survey result analyzing module 68 may set a flag to indicate that follow-up is warranted. Thresholds other than 3.0 may also be used according to the client's wishes or based on other factors. In some embodiments, the automated survey result analyzing module 68 may be configured to automatically send an e-mail or communicate in another manner to the field manager (or others) for follow up. The field manager may then respond by calling the customer to try to resolve any issues.

According to some embodiments, the automated survey result analyzing module 68 may detect if one or more answers indicate the lowest level of satisfaction on the part of the customer. In this case, the automated survey result analyzing module 68 may set the flag indicating the need for follow-up. Also, an automatic e-mail may be sent to the field manager (or others). The automated survey result analyzing module 68 may be configured to analyze the feedback from the survey in any suitable manner to determine if follow-up actions are warranted.

The survey result monitoring module 70 may be a web-based tool that can be accessed by a human operator (e.g., a survey monitor, service manager, field manager, or other authorized personnel of the service group). The survey result monitoring module 70 may provide a user interface enabling the user to access the survey result information, analyzed results from the automated survey result analyzing module 68, digitized voice messages, and/or other information. According to various implementations of the present disclosure, the survey result monitoring module 70 may enable the user to access and listen to the voice messages, enter a transcript of the voice message, enter a summary of the voice message, append notes to the survey result information, select one or more predefined classifications of customer issues, and/or select or recommend one or more follow-up actions. When follow-up actions are selected or recommended, the survey result monitoring module 70 can open a follow-up case for the purpose of monitoring the status of follow-up actions taken until the customer issues are resolved. As used herein, opening cases is understood to include the creation of one or more database records. In some embodiments, survey cases and follow-up cases for the same service may be monitored simultaneously. The survey result monitoring module 70 may provide a link or hyperlink to the survey information and/or voice messages. The input received from the user via the user interface can be stored along with the other information of the survey record and/or follow-up record.

The survey follow-up module 72 may be configured to track the follow-up actions that are taken to resolve customer issues. The survey follow-up module 72 may record and organize information related to the status of the follow-up case, such as, for example, the age of the follow-up case from the start of an opened follow-up case to the present. The survey follow-up module 72 enables access to this information and allows the user to use a searching tool associated with the survey follow-up module 72 to search for specific groups of follow-up cases, based on any factors, such as client, age, region, etc.

When analysis of the survey result information has been done, a follow-up case can be opened if necessary. If the survey is flagged as needing follow-up, the survey follow-up module 72 is configured to initiate follow-up actions. For example, if the survey feedback contains certain scores or marks that fit the specified criteria for needing follow-up, the survey follow-up module 72 may automatically send an e-mail to the field manager responsible for that servicer or service team. In this way, the field manager is informed that follow-up is needed and is incentivized to act quickly to resolve the issues. Along with the e-mail, the survey follow-up module 72 can also transmit the survey result information and recorded voice messages and/or links to the information and voice messages. In some cases, the issues may require the involvement of the client. Depending on how the client decides to establish follow-up routines, the survey follow-up module 72 may communicate information to the client directly or to both the client and the field manager.

The survey follow-up module 72 may be configured to determine the age of a follow-up case and track the progress being made to resolve the issues. The survey follow-up module 72 may be monitored by the survey monitor person to determine if certain issues need to be revisited. The survey follow-up module 72 may enable the transmission or re-transmission of an e-mail as a reminder as necessary to notify the field manager or other responsible party for resolving an older issue. The reminder can be send automatically by the survey follow-up module 72 based on predetermined conditions. In some embodiments, the survey follow-up module 72 may be further configured to calculate incentive payments based in part on survey scores, survey result information, compliments, or other information that is received with respect to the performance by a servicer or service team. Also, the survey follow-up module 72 may calculate bonuses for managers based on survey result numbers. In this respect, the servicers and managers can receive bonus compensation for high quality customer service.

The survey result reporting module 74 may be configured to send reports to one or more clients to inform them of the survey result information, types of issues encountered, overall scores, or other information or data. The reports may be sent automatically to the clients based in part on the client's preferences. Some reports may be communicated daily, monthly, quarterly, or for any time period. The survey result reporting module 76 may be configured to communicate with different groups of people who may be responsible for different aspects of a particular service. For example, when the results of surveys indicate defective products from a client, the survey result reporting module 74 may be configured to send a notice to an individual or department about the detective products.

The survey program 54 of the present disclosure may be implemented in hardware, software, firmware, or any combinations thereof. In the disclosed embodiments, the survey program 54 may be implemented in software or firmware that is stored on a memory device and that is executable by a suitable instruction execution system. The survey program 54 may be implemented as one or more computer programs stored on different memory devices or different computer systems of a network. If implemented in hardware, the survey program 54 may be implemented using discrete logic circuitry, an application specific integrated circuit (ASIC), a programmable gate array (PGA), a field programmable gate array (FPGA), or any combinations thereof.

Figure 7:
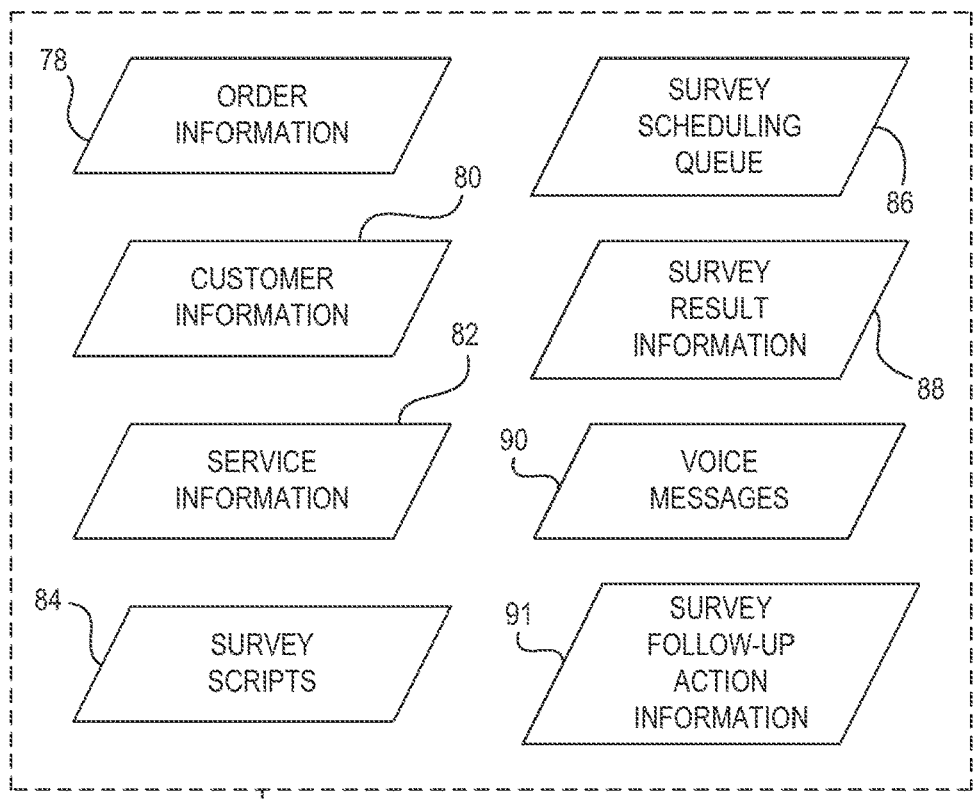
FIG. 7 is a diagram illustrating an embodiment of data segments stored in the database shown in FIG. 5, according to various implementations of the present disclosure.

FIG. 7 is a diagram showing an embodiment of the database 56 shown in FIG. 5. The database 56 may contain various information and data. As illustrated, the database 56 may include order information 78, customer information 80, service information 82, survey scripts 84, a survey scheduling queue 86, survey result information 88, voice messages 90, and survey follow-up action information 91, and may further include other types of data. The service information 82 may be related to any type of service, such as a delivery service, installation service, repair service, or other services. In some embodiments, the voice messages 90 may instead be stored in a separate file system associated with the memory device 50.

The order information 78 may include the store name, product purchases, type of services to be provided, date and time of order, etc. The customer information 80 may include the customer's name, mailing address, billing address, delivery address, telephone and mobile phone numbers, e-mail addresses, preferred means of contact, etc. The service information 82 (e.g., when related to a delivery service) may include the product ordered, shipping identification information of the product, the delivery driver, the carrier, the servicer, the promised delivery time, the actual arrival time, status of delivery, etc.

The survey scripts 84 may include digitized voice scripts of portions of one or more surveys, complete surveys, or other survey information. The survey scheduling queue 86 is a queue for recording the time when survey cases are open, a sequence of surveys to be conducted, etc. The survey result information 88 may include the results, feedback, responses, etc., provided by the customer during the survey. The survey result information 88 may also include result of the analysis by the automated survey result analyzing module 68, such as overall scores. The voice messages 90 may include digitized voice messages recorded during the survey. The voice messages 90 may be stored as files (e.g., on a separate file server) that may be accessed by hyperlinks via the network. The survey follow-up action information 91 may include a record of a classification of customer issues that warrant follow-up actions in addition to a record of follow-up actions to be taken to resolve the customer issues.

Figure 8:
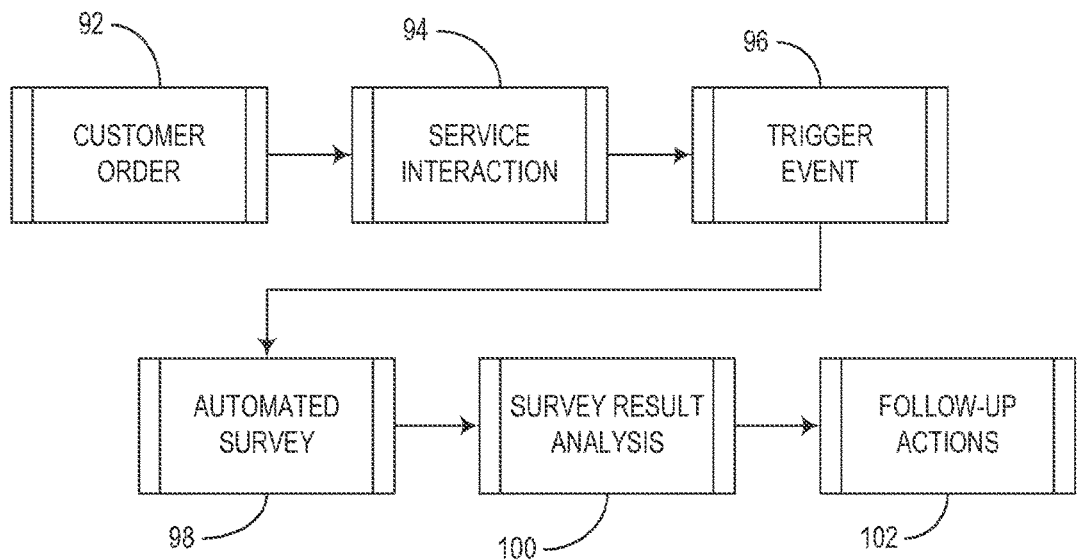
FIG. 8 is a flow diagram illustrating general operations of a survey system according to various implementations of the present disclosure.

FIG. 8 is a flow diagram illustrating an overview of the automated survey process according to various implementations. Customer Order 92 represents the process when the customer orders a product or service from the client. In some implementations, the client collects contact information associated with the customer during the ordering process. This contact information can be used for contacting the customer in order to run the survey.

Service Interaction 94 is the process when a service of any kind is performed for the customer. For example, the service may be a delivery of goods or packages, building and/or installing a product, maintenance, repair, improvement, communication with a service manager or customer service representative, a product registration process, or other services. When the service is complete, it may be advantageous for the client or service group to conduct a survey to collect information about the customer's satisfaction with the service. The collected information can be used to help the service group improve the quality of their services.

When the status of the service case has changed due to the completion of the service job, a survey may be triggered. This is indicated by block 96. One way in which the survey is triggered may include a servicer calling into an IVR device indicating that the job is complete or closed. Another way of triggering a survey may include the servicer using a handheld device to close the job and the handheld device being configured to send a trigger signal to the automated survey system 36. Another way may include the servicer calling a support center to close the job using a landline telephone or mobile phone. When the job is recorded as being closed, the closed status may be detected in the database by a program that creates a survey call record that initiates the deployment of the survey.

After receiving notification of the Trigger Event 96, an Automated Survey may be conducted. The survey may be conducted automatically via a phone call to the customer using an IVR device, e-mail, chat, or other means of communication. The automated survey may include pre-recorded questions and may respond to the answers captured by a numeric keypad, an alphanumeric keyboard, touch screen device, or other data entry device on the customer's telephone, mobile phone, computer, or other device. Responses may be received via telephone, in a return e-mail or chat session, or by other digital entry device. Responses to survey questions may also be in the form of voice messages received via telephone, VoIP, or other voice recording device or system. In some embodiments, the customer may be given the option to wait for live customer care if desired. Also, an option may be given to allow the customer to enter a message other than a voice message, such as, for example, a text message, e-mail message, or other textual based message. According to some implementations, the survey may be started within about ten minutes of the trigger event and completed within about two minutes.

When the survey results are received, the automated survey system is configured to analyze the results. This analysis can be done automatically by the processing system and/or manually by a survey monitor person. The automated analysis may include analysis of the customer data, product data, survey responses, and/or other information. The survey responses may be collected using finite answers, such as an answer 1, 2, 3, 4, or 5 for a ranking in response to a specific survey question. In addition, the survey response may include a voice message, which can be manually analyzed and entered according to certain defined classifications.

In many cases, the results of a survey do not require follow-up with the customer and these survey cases can be closed. However, in some cases, the customer may enter certain responses or leave a voice message that prompts the automated survey system to begin a follow-up process to resolve any issues that the customer may have. When the answers are analyzed, either automatically or manually, the issues may be identified. When these exceptions are identified, a follow-up process is opened to ensure that the issues are treated sensitively. The follow-up may include inquiries to gather additional information from the customer, if needed. Countermeasures may be followed as needed to resolve the issues.

Follow-up actions may be acted upon internally within the service group or if necessary reported to client management and/or client teams. Information from the analysis and the follow-up may be collected and reported to internal teams for future use, such as performance management, improving processes, services and products, tracking costs and issues, billing, etc. Reports include hyperlinks to voicemails for easy access and review.

Figure 9:
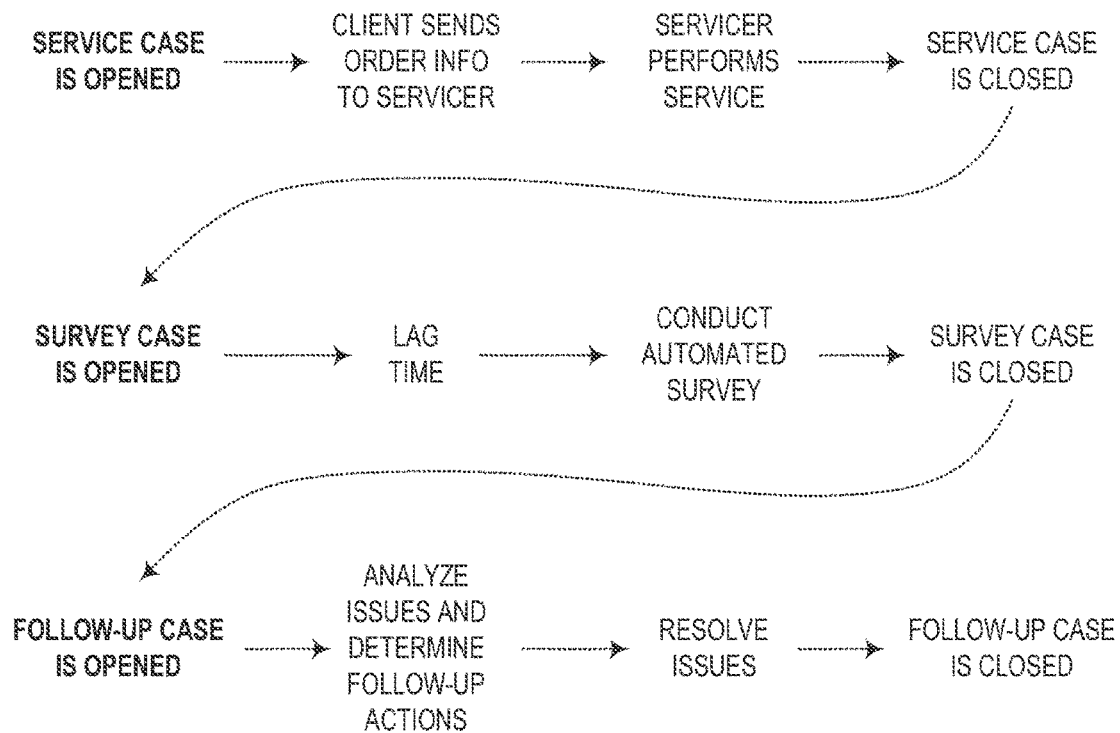
FIG. 9 is a flow diagram illustrating an embodiment of a survey method according to various implementations of the present disclosure.

FIG. 9 is a flow diagram of an embodiment of a method for executing a service case, survey case, and follow-up case. When a customer enters into a business deal with a business in which service is to be provided to the customer in some way, a service case is opened. In some implementations, the client (or business) sends order information to a servicer who acts on the client's behalf. The order information may be related to the specific service order and the customer's personal information. At a scheduled service time, the servicer performs the service for the customer. When the service is complete, the service case is closed.

The closing of the service case, as illustrated in FIG. 9, causes the opening of a survey case. In this respect, the completion of the service job triggers the initiation of the survey case. After a lag time, the survey case includes the conducting of an automated survey. When responses are received from the survey recipient, the survey case is closed.

When the survey case is closed, a follow-up case is opened to determine if follow-up to the survey is needed. Any issues fed back by the customer are analyzed to determine if follow-up actions are needed. If so, the appropriate people are contacted in order to resolve the issues. When the issues are resolved, the follow-up case is closed.

Figure 10:
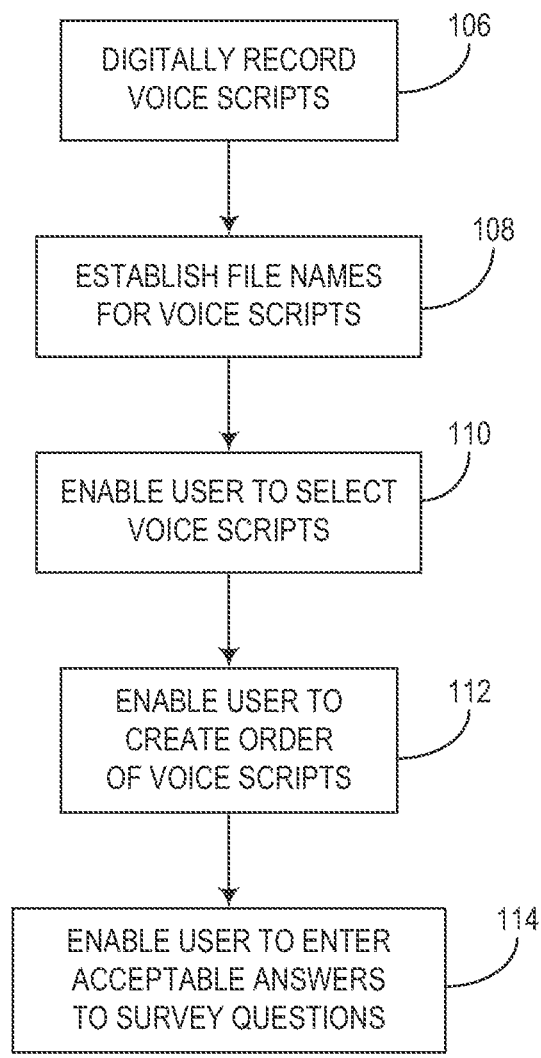
FIG. 10 is a block diagram illustrating an embodiment of a method for creating a survey according to various embodiments.

FIG. 10 is a flow diagram illustrating an embodiment of a method for creating a survey. In this embodiment, the method includes digitally recording voice scripts as indicated in block 106. For example, each voice script may be one or more survey question and/or one or more statements or sentences. As indicated in block 108, file names for the voice scripts are established. This process may include automatically naming the files based on the spoken language, store, store brand, product information, or other information. Block 110 includes enabling a user to select one or more voice scripts from the recorded scripts that may be used to form a completed survey. The user may be enabled to add and/or delete scripts. In some embodiments, certain scripts may be automatically selected depending on client preferences, based on a bill code associated with a client brand (if the client has multiple brands), based on order criteria, or based on other factors. Regarding the selection based on order criteria, a service order in one particular example may include a delivery and assembly, and hence automatic selection of both delivery-related questions and assembly-related questions can be made. The method further includes enabling a user to arrange the scripts in a particular order, as desired, to form a certain logical sequence of scripts for the survey, as suggested in block 112. As indicated in block 114, the user is enabled to enter the answers from the survey recipient that are acceptable for the particular survey questions.

FIG. 11 is a screen shot of a user interface 118 for creating an automated survey according to various implementations of the present disclosure. The user interface 118 includes, among other things, a sequence column 120 that displays a sequence of survey scripts that form the entire survey and enables the user to change the sequence as needed. A question ID column 122 identifies the respective survey scripts (i.e., questions and/or statements). A question description column 124 includes a description of the respective survey script. An answer options column 126 enables the user to enter the acceptable feedback responses, based in part on the questions being asked. Column 128 enables the user to select which answers to the respective questions are to be shown on a web-enabled user interface that reports the survey result information to the appropriate individuals responsible for handling customer issues.

The user interface 118 also includes an add button 132, enabling the user to add a selected question or statement to the survey. A delete button 134 enables the user to delete one or more questions, and a save button 136 enables to the user to save the survey when it is complete. The user interface 118 may also include a "sample playback" button allowing the user to listen to how the created survey might sound.

FIG. 12 is a diagram illustrating an example of a completed survey 140 according to various implementations. The survey 140 in this example includes an introduction, survey instructions, list of questions, and a statement giving the survey recipient an opportunity to leave a voice message. It should be understood that other wording of sentences, the wording of questions, the sequence and types of questions asked, and other aspects of the survey can be modified to meet the particular client's needs. In some implementations, the survey 140 can be formed using preset elements. The survey 140 can be read and recorded, and then accessed for playback during the survey. Elements to allow time for answers to be entered by the survey recipient can be added as needed.

Figure 13:
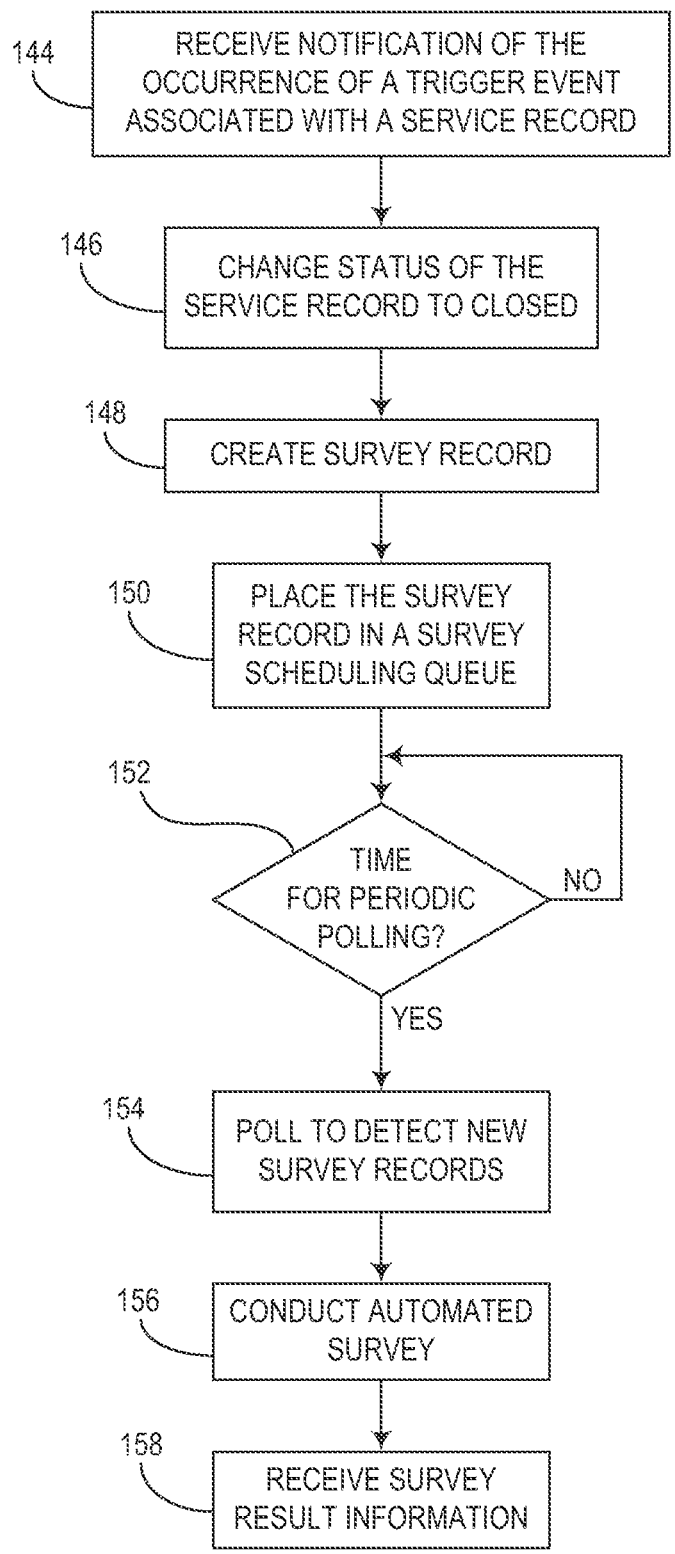
FIG. 13 is a flow diagram illustrating a method for triggering and conducting a survey according to various implementations of the present disclosure.

FIG. 13 is a flow diagram illustrating an embodiment of a method for triggering and conducting a survey according to various implementations. As illustrated in FIG. 10, the method includes receiving notification of the occurrence of a trigger event associated with a service record in accordance with block 144. Particularly, the trigger event may be the completion of the designated service. As indicated in block 146, the method includes changing the status of the service record to closed. The survey record is then created, as indicated in block 148, and is placed in a survey scheduling queue, as indicated in block 150.

According to decision block 152, it is determined whether or not a periodic time for performing a polling function has arrived. For example, the polling function may be configured to operate every 10 or 15 minutes. If the proper time has not yet arrived, the flow path loops back to itself and block 152 is repeated until the time arrives. When it is time for polling, the database is polled to detect new survey records, as indicated in block 154. Block 156 indicates that the method includes conducting an automated survey. The order that the automated surveys are launched may be based in part on the sequence of survey records in the survey scheduling queue. The process of conducting the automated survey is described in more detail below. As indicated in block 158, survey result information is received. The survey result information may be choices entered by the survey recipient, voice messages, or other useful data.

Figure 14:
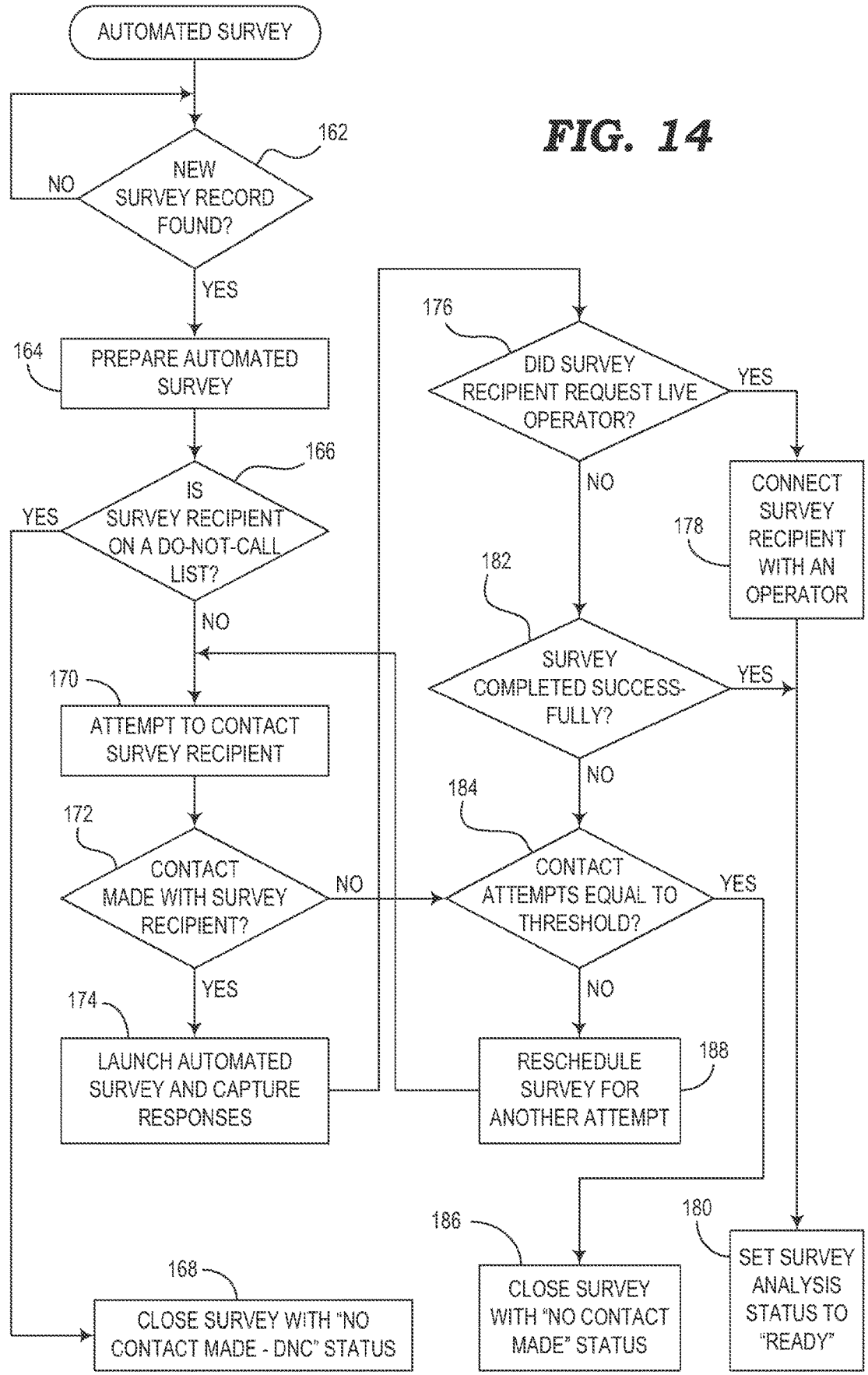
FIG. 14 is a flow diagram illustrating a method for conducting an automated survey according to various implementations of the present disclosure.

FIG. 14 is a flow diagram illustrating an embodiment of a method for conducting an automated survey according to various implementations. The automated survey conducting method includes determining, according to decision block 162, whether or not a new survey record has been found. If not, the flow path returns back to block 162 until one is found. When found, an automated survey is prepared, as indicated in block 164. The preparing of the survey may include, for example, accessing scripts and questions, accessing contact information, or other functions for forming an appropriate survey. The information gathered together to prepare the survey may include field manager case information, client order information, client product information, a library of survey scripts and questions, and other suitable information.

According to decision block 166, it is determined whether or not the survey recipient is on a do-not-call list. If so, the method skips ahead to block 168, which indicates that the survey case is closed with a status of "no contact made—DNC." If the survey recipient is not on the do-not-call list, the method flows to block 170, which indicates that an attempt is made to contact the survey recipient. According to decision block 172, it is determined whether or not contact is made with the survey recipient. If not, then the flow proceeds to decision block 184. If contact is made, the flow proceeds to block 174, which indicates that the automated survey is launched and responses by the survey recipient are captured.

During the automated survey, the survey recipient is given the option to speak with a live operator. If it is determined in decision block 176 that the survey recipient requests to speak to someone live, then the flow branches to block 178. As indicated in block 178, the survey recipient is connected with an operator, such as a customer service agent, for the completion of the survey. When the live survey is completed, the survey analysis status is set to "ready" as indicated in block 180. If in block 176 it is determined that the survey recipient does not wish to talk with a live operator, the flow proceeds to decision block 182. According to block 182, it is determined whether or not the survey was completed successfully. If so, the flow proceeds to block 180 to set the survey analysis status to "ready." If the survey did not complete successfully, as determined in block 182, flow proceeds to decision block 184.

Block 184 is reached when the survey recipient could not be contacted (decision block 172) or when the survey was not completed successfully (decision block 182). At this point, it is determined whether or not the number of contact attempts is equal to a predetermined threshold. If the number of contact attempts is determined to be equal to the threshold, flow proceeds from block 184 to block 186 and the survey is closed with the status of "no contact made." If not, then the method goes to block 188, in which the survey is reschedule for another attempt, and the flow then proceeds back to block 170.

Figure 15:
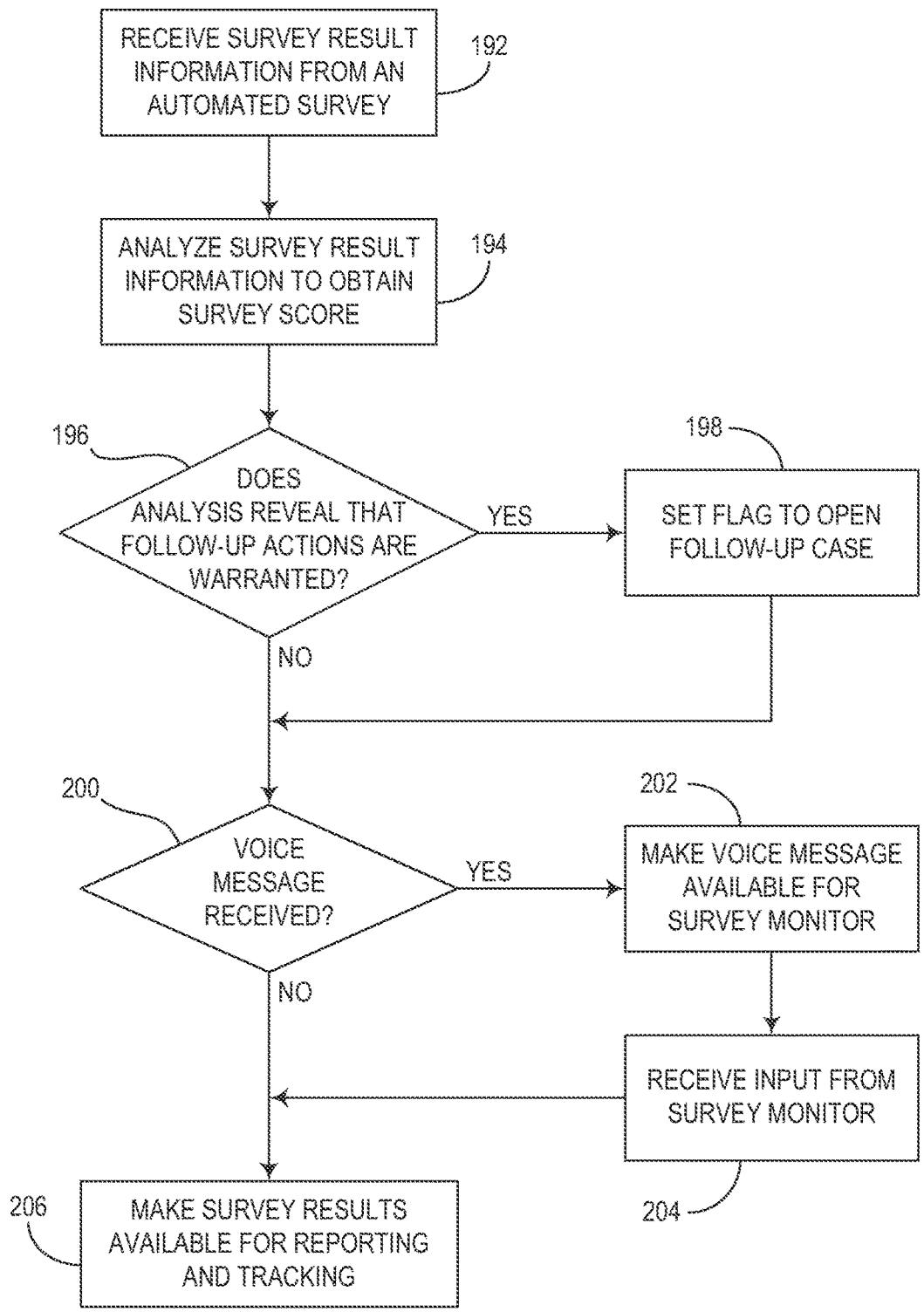
FIG. 15 is a flow diagram illustrating a method for handling survey result information according to various implementations of the present disclosure.

FIG. 15 is a flow diagram illustrating a method for handling survey result information according to various implementations of the present disclosure. The method includes receiving survey result information from an automated survey, as indicated in block 192. According to block 194, the method includes analyzing the survey result information (e.g., averaging the survey result information) to obtain a survey score. It is determined, according to decision block 196, whether the analysis reveals that follow-up actions are warranted or not, such as by automatically comparing an average score to a defined threshold. If so, a flag is set to open a follow-up case as indicated in block 198. However, if no follow-up is warranted based on the analysis, flow proceeds from block 196 to decision block 200. In block 200, it is determined whether or not a voice message was received. If so, the voice message is made available for access by a survey monitor person according to block 202. Also, input may be received from the survey monitor person, as indicated in block 204. The input received from the survey monitor person may include a summary of the voice message, selection of one or more customer issues from a list, selection of one or more follow-up actions from a list, a flag set to open a follow-up case, and/or other inputs. The flag to open the follow-up case may be set in response to the content and interpretation of the voice message. Block 206 indicates that the survey results are made available for reporting to various individuals, teams, departments, or others and for tracking the progress of the follow-up actions.

Figure 16:
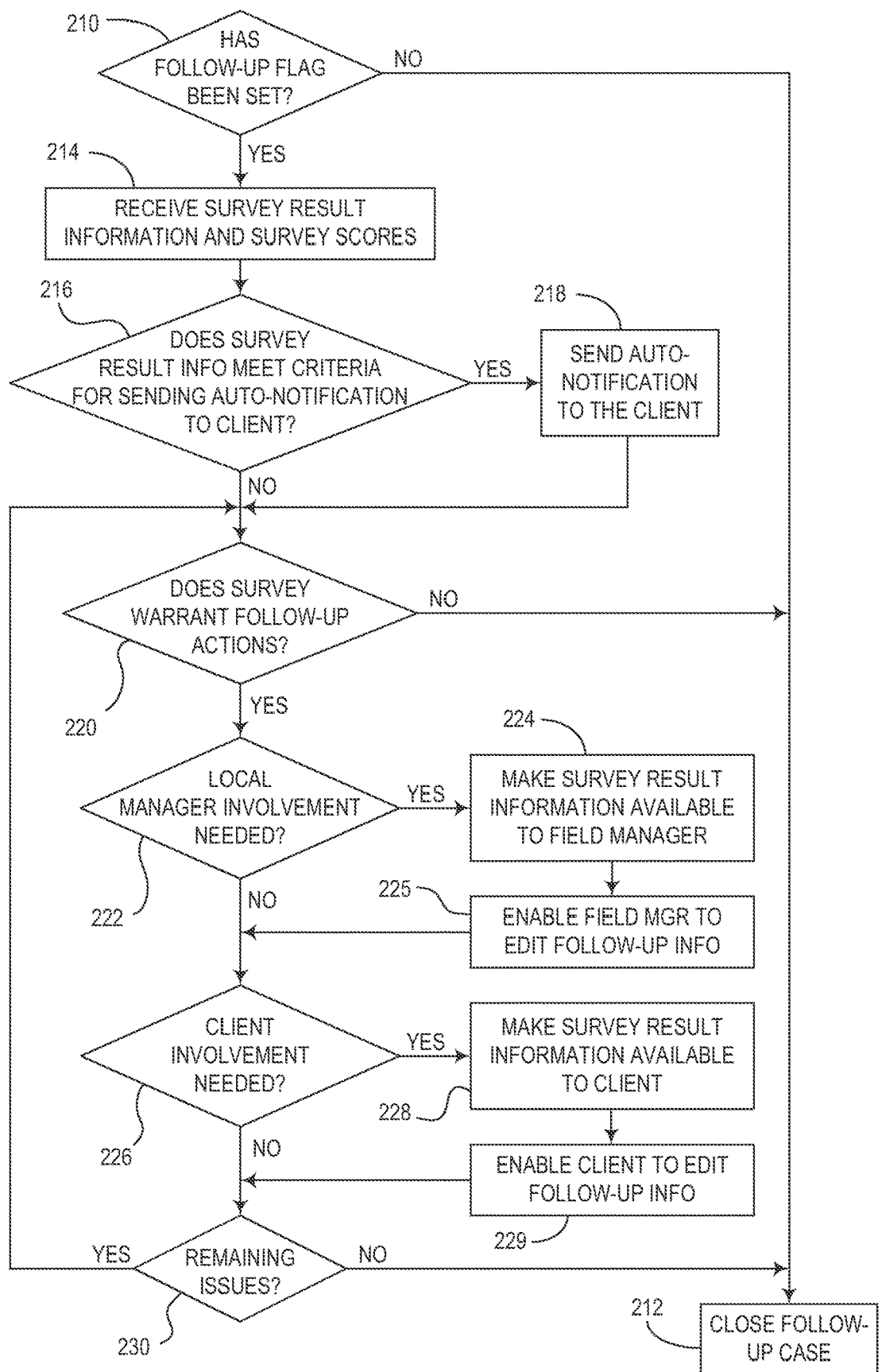
FIG. 16 is a flow diagram illustrating a method for performing survey follow-up actions according to various implementations of the present disclosure.

FIG. 16 is a flow diagram illustrating an embodiment of a method for performing survey follow-up actions according to various implementations of the present disclosure. As indicated in decision block 210, it is determined whether or not a follow-up flag has been set. If not, which indicates that no follow-up is needed, then the flow of the method skips to block 212 and the follow-up case is closed. If a flag is set, the flow proceeds to block 214, which indicates that the survey result information and survey scores are received. As indicated in decision block 216, it is determined whether the survey result information meets certain criteria for sending an auto-notification to the client. The client may request to receive automatic notification based on any suitable conditions or criteria associated with the survey result information. For example, if the client requests to receive notification of compliments and if one or more compliments are recorded in the survey results, then the criteria in this case are met. If it is determined in block 216 that the criteria are met, an auto-notification of the survey details is sent to the client, as described in block 218. In some embodiments, block 218 may be omitted if the client chooses not to receive auto-notifications.

After compliments are handled, the flow proceeds to decision block 220, which indicates that a determination is made whether the survey score warrants one or more follow-up actions. If not, then the flow skips to block 212 and the follow-up case is closed. However, if follow-up is warranted, the method flows on to decision block 222, which determines whether involvement by a field manager is needed. If so, the survey result information (which may include any of the survey answers, survey scores, and voice messages) is made available to the field manager, according to block 224. When the survey result information is received, the field manager may be enabled to add or edit follow-up information, as indicated in block 225. For example, the field manager may log any follow-up actions taken to resolve the issues. The field manager may also set classifications of issues and set follow-up actions that were not previously recorded. The field manager may also be enabled to mark when the follow-up case is closed, e.g., when all the issues have been resolved. The method also includes checking if client involvement is needed, as indicated in decision block 226. If so, the flow is directed to block 228 and the survey result information is made available to the client. As indicated in block 229, the client is enabled to add and/or edit follow-up information. In some embodiments, the client's name may be logged in during the modification process. The types of follow-up information that can be modified in this method may be different for the field manager, client, and others who may be given access to the information and authority to change the information, depending on the particular design.

The information made available to the client may be different than that made available to the field manager, depending on the particular design. The field managers and clients, when given the information, may be responsible for contacting the customer, service group members, or others by any available communication devices in order to help resolve the issues. Decision block 230 indicates that it is determined whether or not any issues remain. This determination may be made by the field manager, who may set a flag, mark an item on a checklist, enter a summary, or other operation that may be detectable by the survey program 54. These indications can be analyzed to determine that the issues are resolved. If no issues remain, the flow goes to block 212 and the follow-up case is closed. If issues still remain, the flow loops back to block 220 to repeat follow-up actions until the issues can be resolved.

The flow diagrams of FIGS. 9, 10, and 13-16 show the architecture, functionality, and operation of possible implementations of the survey program 54. In this regard, each block may represent a module, segment, portion of code, etc., which comprises one or more executable instructions for performing the specified logical functions. It should be noted that the functions described with respect to the blocks may occur in a different order than shown. For example, two or more blocks may be executed substantially concurrently, in a reverse order, or in any other sequence depending on the particular functionality involved.

The survey program 54, which comprises an ordered listing of executable instructions for implementing logical functions, may be embodied in any computer-readable medium for use by any combination of instruction execution systems or devices, such as computer-based systems, processor-controlled systems, etc. The computer-readable medium may include one or more suitable physical media components configured to store the software, programs, or computer code for a measurable length of time. The computer-readable medium may be any medium configured to contain, store, communicate, propagate, or transport programs for execution by the instruction execution systems or devices.

Figure 17:
FIG. 17 is a screen shot of a user interface for enabling access to voice messages according to various implementations of the present disclosure.

FIG. 17 is a screen shot of a user interface 231 for enabling access to voice messages according to various embodiments. User interface 231 lists the survey responses that include a voice message that needs to be verified. More specifically, verifying a voice message may include the actions toward the voice message of screening, filtering, sorting, searching, or other actions. Section 233 of the user interface 231 includes information about the profit center (business), job identification numbers, customer, and the time and date when each respective survey was completed. Column 234 shows if the respective survey feedback included a low overall score, representing poor quality service, such as one below a minimum threshold. Column 235 includes a link to the different voice messages. If the user wishes to hear the message, the user may click on the "Listen" link to retrieve the voice message file. If the voice message warrants follow-up actions, the user can select either yes or no in the response required column 236. In column 237, the details of the surveys can be retrieved by the user by clicking on the respective "Details" link.

FIGS. 18A and 18B are parts of a screen shot of a user interface 238 for enabling a user to enter follow-up actions to be taken, according to various implementations of the present disclosure. The user interface 238 may be opened, for example, by clicking on the detail link in column 237 shown in FIG. 17. Also, the user interface 238 may be opened when the user clicks on the "listen" link in column 235. In section 240 of user interface 238, information about the order, profit center, servicer, customer, etc. is displayed. Within section 240 is a link 241 that enables a user to access a voice message, if one is left. In section 242, information about the survey questions is displayed.

Section 244 of the user interface 238 enables the user to check certain listed items to define the customer's issues and categorize them into classification categories. The list of issues included in section 244 may be customized for the client based on the client's needs, based on the particular service provided, based on the particular product being delivered, or based on any other factors. Some non-limiting examples of customer issue items listed in section 244 may include a scheduling issue, an incorrect phone number, an issue with the contract carrier, a delivery fee issue, a schedule notification issue, poor service at the store, a damaged product, the product missing items, the wrong product delivered, the wrong address, a store or client issue, a voice message compliment, or any other service issues. In some embodiments, the selection of at least of the classification items can be required before a case is closed. By listening to the voice message, the user may be able to determine the classification of issues described audibly.

Section 246 includes a list of possible ways to resolve the issues marked in section 244. This list may also be customized for the particular client depending on various factors. Some non-limiting examples of resolution items listed in section 246 may include the issuing of a gift card to the customer, passing the information on the store or client, leaving a voice message for the client, recording a voicemail summary, or other ways of reaching resolution. Other items may also include the closure of the follow-up case based on a failure to contact the customer or a representative speaking with the customer to resolve some issue, addressing the issue with the delivery team, or the customer misunderstanding the survey. The user interface 238 enables the user to check the appropriate boxes of section 246 as needed. The user interface 238 may display certain additional information fields depending on the selections made in section 246. For example, if the user selects "Passed to Store/Client", the user interface 238 may prompt the user to enter the name of the person to which the survey result information is passed. According to another example, if the user selects "Issue Gift Card", the user interface 238 may prompt the user to enter the monetary amount of the gift card to be issued.

If a voice message is left, the user may listen to the message by clicking on the link 241 and then may enter a summary of the voice message in window 248. The window 248 can also be used to record steps that were taken by different people of the service group to resolve issues or any other notes that may be necessary for understanding the issues of the case. The summaries entered in window 248 are displayed in section 250 when inserted by the user. The Actions selected in section 246 are also automatically displayed adjacent section 250. If the follow-up case is to be closed, the user may check the box 252.

FIG. 19 is a screen shot of an embodiment of a user interface 256 for enabling access to survey result information. The user interface 256 may be created automatically when the survey recipient leaves a voice message. In this embodiment, the user interface 256 displays a table 258 having details of the order, store, carrier, driver, customer, customer contact information, promised delivery time window, actual arrival time, etc. The user interface 256 also includes a table 260 displaying the survey questions, response options, and the answers provided. Table 260 also displays a calculation of the average score. Window 262 shows a summary of the voice message left by the survey recipient and textual entries made by the service team monitoring the status of the survey and follow-up.

The user interface 256 also includes a link 257 allowing the user to respond to the survey recipient. Also, the user interface 256 includes a link 264, which allows the user to listen to a recording of the voice message left by the survey recipient. For example, the voice message may include any file format, such as a .wav file, a vox file, etc.

FIG. 20 is a screen shot of an embodiment of a user interface 266. The user interface 266 may be created automatically when the overall score 267 displayed in a survey result section is below an acceptable threshold. For example, if the survey questions are based on a five-point scale with "5" representing complete satisfaction and "1" representing complete dissatisfaction, then a threshold of about 3.0 (or any other suitable number) may be set. Therefore, an overall score below 3.0 (in this case) may initiate the generation of the user interface 266. The user interface 266 may also include a delivery notes section 268 and an order history section 269. The delivery notes section 268 may include notes that were recorded when the customer placed an order. As an example, the delivery notes 268 may be useful for the completion of certain services. The order history section 269 may include a history of the order case, survey case, and/or follow-up case of a service order. Information in the order history section 269 may be entered manually and/or automatically.

FIG. 21 is a screen shot of an embodiment of a user interface 270 for enabling a search of survey responses. The user interface 270 may be made available to each of the service managers and other personnel responsible for monitoring the orders, surveys, and follow-up cases for a service company. The user interface 270 allows the user to search for follow-up cases and view the details of the follow-up cases. If box 272 is checked, only the follow-up cases that are still open (or pending) are searched. In field 274, the user can select one or more profit centers (or business segments) depending on the need. Also, the user can select the option to search all the profit centers of the service company. Fields 276 and 278 allow the user to enter the timeframe in which the search is made. When the search button 280 is selected, the user interface 270 is configured to search the database for follow-up cases that match the search criteria and display the results in table 282.

The table 282 includes rows of different entries arranged with columns for the profit center, the customer receiving the service ("ship to"), the job number, the time and date the follow-up case was opened ("reported at"), the deadline, the age of the follow-up case, whether a low score was received in the survey, whether a voice message link is available, the number of responses, whether the follow-up case has been closed, and a details link linking to the details of the survey. The table 282 may list the follow-up cases in a sequence from the oldest case to the newest, ordered according to the age column. The age column may work with a suitable clock or timing device to update the age of opened cases every six minutes (0.1 hours). The age may be used by the service team to give priority to older issues.

FIGS. 22A and 22B are screen shots of a service issue report 286 according to various implementations of the present disclosure. The service issue report 286 may be communicated to the client or store to report issues regarding the order or service that need attention by the store. The clients may be given the option to receive such a report at different stages of the follow-up or when certain situations occur. In this embodiment, the service issue report 286 includes an information table 288, a survey result table 290, a voice message link 292, and a voice message response table 294 shown in FIG. 22B. The information table 288 includes information about the order, service, customer, etc., and the survey result table 290 includes respective responses to the survey questions. The user can click on the voice message link 292 to accept the voice message file and listen to the recording. In some implementations, the voice message response table 294 shows the voice message summary and a summary of follow-up calls (e.g., by JBROWN in this example) to the customer to resolve the issues.

FIG. 23 is a diagram of an embodiment of a quality report 300. In this example, the quality report 300 may be communicated to the client (i.e., "Acme"). The quality report 300 includes the client's survey scores broken up among the different regions (e.g., starting in this example with the New York region). Also, the quality report 300 divides each region down to the individual servicers. With this report, the client can obtain useful information about the overall success of the delivery teams, the success of teams within each region, and success of individual servicers.

FIG. 24 is a diagram of a survey feedback report 304 according to various implementations of the present disclosure. The survey feedback report 304 may include a table 306 showing the daily survey results, a table 308 showing the month-to-date survey results, and a table 310 showing a response classification matrix. The survey result reporting module 74 (FIG. 6) may be configured to send the survey feedback report 304 to the service managers and other teams of the service group. The report may be transmitted with an e-mail or may be accessed using a hyperlink. The survey feedback report 304 may be sent on a periodic basis to keep the managers and teams up to date. For example, it may be sent on a daily basis, issued on the morning following the day of service being reported. The next-day information can be useful for training or coaching purposes, such as for use by a manager to coach service teams to practice proper technique and behavior that may better please the customers. In this way, service teams can be given immediate feedback based on the previous day's survey responses.

The daily survey result table 306 may include numbers broken out by region. The columns of the daily survey result table 306 include the number of service orders (e.g., deliveries), the number of surveys completed, the percentages of customers completing the survey, and an average score goal. The daily survey result table 306 also may include the particular questions of the survey, such as whether the customer would desire to have the delivery team back, the appearance of the delivery team, on-time success, call ahead success, whether the delivery team properly tested and demonstrated the product, the professional courtesy of the team, and the overall average score.

The month-to-date results table 308 may include the same column divisions as the daily report but for the longer time period from the first of the month to the present. The response classification matrix table 310 includes columns for each of a number of specific customer issues. For example, the table 310 may include scheduling issues, incorrect phone number issues, contract carrier issues, notification of deliver time issues, damaged product issues, address issues, store/client issues, etc.

According to various implementations, the survey result reporting module 74 (FIG. 6) may generate one or more reports describing the issuance of gift cards. For example, the follow-up action of issuing a gift card may be initiated by a user selecting the item labeled "Issued Gift Card" in the follow-up actions section 246 of the user interface 238 (FIG. 18). Gift cards may be issued when service mistakes, mishaps, or other problems occur. The gift cards may be used to reimburse, compensate, or in some way appease the customer for the service problems. Since the service group is representing the client, the issued gift cards may be valid only at the client's stores, for example, or in other embodiments may be valid at any stores.

The service managers may analyze the events surrounding the service problems and determine if a particular servicer is at fault or responsible. If it is determined that a particular servicer is responsible for the service problem, such as for arriving outside the promised time window, failing to complete the service, and/or other problems, then the automated survey system 36 may be configured to automatically subtract the gift card amount from the servicer's pay. In this respect, the amount that the managed services 22 pays for gift card issuance is charged back to the servicer. However, if the problem is not caused by the servicer but is caused by other operators or systems, then the servicer is not held responsible.

FIG. 25 is a diagram of an embodiment of a survey response report 314. The survey response report 314 includes tables for follow-up cases that remain opened and those that are closed. The survey response report 314 also includes for each case the customer, classifications of issues, overall score on the survey, age of the case, summary notes, and access to more details of the case.

FIG. 26 is a diagram of an embodiment of a summary quality report 318 according to various implementations. The summary quality report 318 includes a first column 320, which includes each of the stores of a client, divided regionally. A second column 322 includes the overall average survey scores for the respective stores, and a third set of columns 324 includes the average scores and number of surveys completed for each of the questions asked on the surveys. In some embodiments, the survey result reporting module 74 may be configured to distinguish between the average scores that meet a particular goal and those that do not meet the goal. For example, a first score 326 may be displayed in one manner (e.g., black) while another score 328 may be displayed in a different manner (e.g., red).

Many advantages might be gained by a service business or other entity by the use of the survey network system 34 and particularly the automated survey system 36 and survey program 54. For example, one benefit might be the ability to provide rapid follow-up actions to customers that have issues. In some cases, it may be possible to resolve the customer's issue within two hours, which is a desirable service goal for a service company. By responding to issues quickly, the overall customer satisfaction level of a service group can be high.

Another advantage might be the aspect of performing the survey using an automated system as opposed to a survey conducted by a live operator. An automated system may allow the survey recipient to answer more truthfully and may also lead to a high survey participation rate. For example, many surveys have a participation rate of under 10%. However, with the automated survey system 36 described herein, a participation rate of about 40% or higher can been achieved. In this respect, the service company can obtain a larger sample of data that may better define the satisfaction level of the customers. Also, by conducting the survey at an advantageous time, which is controlled by the automated survey system 36, customers are more likely to take the survey and likely to answer more accurately, because the service experience might still be fresh in their minds.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. An automated survey system including a memory device and a processing device, the automated survey system configured to:
    save a plurality of customer orders in a database in the memory device;
    receive a notification indicating completion of one of the plurality of customer orders, the customer order being completed by a servicer at a customer location;
    update the one of the plurality of customer orders in the database to indicate a closed status responsive to the received notification;
    periodically poll the database to detect if any of the customer orders has a closed status;
    responsive to the one of the plurality of customer orders being detected as having a closed status, create a survey case associated with the one of the plurality of customer orders having a closed status to indicate that a survey is to be conducted;
    store the survey case in a scheduling queue;
    prepare a survey in response to the survey case in the scheduling queue;
    contact a customer associated with the customer order associated with the survey case;
    conduct the survey with the customer;
    capture survey result information from the customer in response to conducting the survey; and
    close the survey case after capturing the survey result information from the customer.

2. The automated survey system of claim 1, wherein preparing a survey comprises retrieving at least one pre-recorded question associated with the one of the plurality of customer orders associated with the survey case.

3. The automated survey system of claim 1, wherein preparing a survey comprises retrieving from the database customer contact information associated with the one of the plurality of customer orders associated with the survey case.

4. The automated survey system of claim 1, wherein the notification indicating completion of the one of the plurality of customer orders is a result of automatically detecting the servicer's departure from the customer location based on global positioning system data.

5. The automated survey system of claim 1, wherein the notification indicating completion of the one of the plurality of customer orders comprises a message transmitted by the servicer.

6. The automated survey system of claim 1, wherein the servicer is an individual or team responsible for performing a service for the customer.

7. The automated survey system claim 1, wherein contacting the customer comprises calling a telephone number associated with the customer.

8. The automated survey system of claim 7, wherein conducting the survey comprises playing pre-recorded survey questions.

9. The automated survey system of claim 7, wherein the survey result information comprises numeric answers to the survey questions via a telephone communication channel.

10. The automated survey system of claim 1, wherein capturing the survey result information further comprises:
    receiving a voice message from the customer; and
    digitally recording the voice message.

11. The automated survey system of claim 1, further configured to:
    digitally record a plurality of voice scripts;
    receive from a user a selection of one or more of the voice scripts to be combined into the automated survey; and
    receive from the user an arrangement of the one or more voice scripts in a specific order.

12. The automated survey system of claim 11, wherein each voice script is a survey question.

13. A computer-implemented method for conducting an automated survey, comprising the steps of:
    storing order information associated with a plurality of customer orders and services to be provided to a customer by a servicer;
    receiving a notification that one of the plurality of customer orders has been completed;
    updating, in response to the notification, the one of the plurality of customer orders to indicate a closed status;
    determining, as part of a periodic polling process, that the one of the plurality of customer orders has a closed status;
    creating, in response to the determination that the one of the plurality of customer orders has a closed status, a survey case to indicate that a survey is to be conducted regarding the one of the plurality of customer orders that has a closed status;
    storing the survey case in a scheduling queue;
    preparing a survey responsive in the survey case in the scheduling queue;
    contacting the customer associated with the one of the plurality of customer orders that has a closed status;
    conducting the customer survey with the customer; and
    capturing survey result information from the customer.

14. The computer-implemented method of claim 13, further comprising the step of closing the survey case after capturing the survey result information.

15. The computer-implemented method of claim 13, wherein preparing a survey comprises retrieving customer contact information associated with the one of the plurality of customer orders associated with the survey case.

16. The computer-implemented method of claim 13, wherein the notification that one of the plurality of customer orders has been completed is triggered by automatically detecting a departure from the customer location using global positioning system data.

17. The computer-implemented method of claim 13, wherein the notification that one of the plurality of customer offers has been completed comprises a message initiated by the servicer.

18. The computer-implemented method of claim 13, wherein contacting the customer comprises calling a telephone number associated with the customer.

19. The computer-implemented method of claim 18, wherein conducting the survey comprises playing recorded survey questions and receiving numeric answers via a telephone communication channel.

20. The computer-implemented method of claim 13, wherein capturing survey result information comprises:
   receiving a voice message from the customer; and
   recording the voice message.

\* \* \* \* \*